US008905299B1

(12) United States Patent
Ma et al.

(10) Patent No.: US 8,905,299 B1
(45) Date of Patent: Dec. 9, 2014

(54) AUTOMATED BANKING MACHINE THAT OPERATES RESPONSIVE TO DATA BEARING RECORDS

(71) Applicant: Diebold Self-Service Systems division of Diebold, Incorporated, North Canton, OH (US)

(72) Inventors: Songtao Ma, Wadsworth, OH (US); David A. Peters, Tallmadge, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 0 days.

(21) Appl. No.: 13/780,056

(22) Filed: Feb. 28, 2013

Related U.S. Application Data

(63) Continuation of application No. 13/400,361, filed on Feb. 20, 2012, now Pat. No. 8,387,867, which is a continuation of application No. 12/313,370, filed on Nov. 19, 2008, now Pat. No. 8,118,217.

(60) Provisional application No. 61/003,645, filed on Nov. 19, 2007.

(51) Int. Cl.
*G06K 5/00* (2006.01)
*H04N 1/56* (2006.01)
*G07F 19/00* (2006.01)

(52) U.S. Cl.
CPC ............... *H04N 1/56* (2013.01); *C07F 19/201* (2013.01); *G07F 19/20* (2013.01)
USPC .......................................... 235/379; 235/380

(58) Field of Classification Search
CPC ....... G07F 19/20; G07F 19/202; G07D 7/122; G07D 7/121; G07D 11/0096; G07D 7/20; G07D 11/0084; G07D 7/00; G07D 7/12; G06Q 20/18
USPC ............................................. 235/379; 356/71
See application file for complete search history.

(56) References Cited

U.S. PATENT DOCUMENTS 6,757,012 B1 *  6/2004  Hubina et al. ............. 348/222.1
2004/0169846 A1 *  9/2004  Ross .............................. 356/71

* cited by examiner

*Primary Examiner* — Christopher Stanford
(74) *Attorney, Agent, or Firm* — Black, McCuskey, Souers & Arbaugh, LPA

(57) ABSTRACT

An automated banking machine controlled responsive to data bearing records includes a card reader that reads identifying data from a user card. A host banking system authorizes operation of an automated banking machine responsive to computer verification of the identifying data. The automated banking machine can dispense cash to an authorized machine user in a cash dispensing transaction, and have the user's bank account charged for the cash amount dispensed. The automated banking machine can acquire image and magnetic data read from deposited checks to determine the genuineness of checks and the authority of a user to receive cash for the checks. Cash can be dispensed from the machine to a user in exchange for a deposited check.

10 Claims, 18 Drawing Sheets

Check Deposit

1. RECEIVE ID DATA
   (PAN/PIN: BIOMETRIC)

2. RECEIVE TXN TYPE
   (CHECK DEPOSIT: CASH CHECK: OTHER DOCUMENT)

3. RECEIVE INPUT AMOUNT 4. (OPTIONAL) OUTPUT CHECK CASHING FEE
   ACKNOWLEDGMENT PROMPT - CONTINUE
   OR CLOSE BASED ON RESPONSE

5. OPEN GATE

6. MOVE DEPOSITORY TO DOCUMENT RECEIVE
   POSITION

7. RUN TRANSPORT

8. SENSE DOCUMENT

9. MEASURE DOCUMENT LENGTH

10. RUN TO READY TO SCAN POSITION

11. RUN TO SCAN
    (ACQUIRE IMAGE DATA)
    (ACQUIRE MAGNETIC PROFILE DATA)

12. APPLY RULES CONCERNING DOCUMENT TYPE

13. DESKEW IMAGE
    - FIND 3 CORNERS
    - CALCULATE ANGLE - SHIFT IMAGE
    - MOVE TO REFERENCE - SHIFT IMAGE

FIG. 9

14  APPLY TEMPLATE FOR DOCUMENT TYPE

15  READ DATA IN MICR LINE
      (MICR LINE : OPTICALLY READ)

16  PASS CROPPED DATA FROM MICR LINE
      WINDOW TO RECOGNITION SOFTWARE
        (MICR LINE   E - 13B)

17  RETURN ASC II VALUES

18  CHECK MICR DATA FOR ROUTING AND
      TRANSFER VALUES

19  DETERMINE IF MICR VALUES ARE
      ABOVE THRESHOLD
        (IF YES - GO TO 26)
        (IF NO - GO TO 20)

20  FLIP IMAGE 180 DEGREES

21  READ DATA IN MICR LINE

22  PASS CROPPED DATA FROM MICR
      LINE TO RECOGNITION SOFTWARE

23  RETURN ASC II VALUES

24  CHECK MICR DATA FOR ROUTING
      AND TRANSFER VALUES

25  DETERMINE IF MICR VALUES
      ARE ABOVE THRESHOLD
        (IF NO - CHECK CANNOT BE READ
          RETURN CHECK AND CLOSE TXN)
        (IF YES - GO TO 26)

FIG. 10

26  READ DATA IN COURTESY AMOUNT WINDOW
    (US CHARACTERS)

27  USE LANDMARK RULES TO FIND COURTESY
    AMOUNT (LOOK FOR BOX, "$", "XX"/100, "**")

28  BINARIZE COURTESY AMOUNT DATA (BLACK/WHITE)

29  RETURN ASC II VALUE FOR COURTESY
    AMOUNT

30  CHECK FOR SENSING MAGNETIC INK
    IN CORRECT LOCATIONS BASED ON
    DOCUMENT TYPE AND IMAGE DATA
    (IF NOT PROPER MAGNETIC PROFILE
    RETURN CHECK AND CLOSE TXN)
    (IF PROPER MAGNETIC PROFILE - GO TO 31)

31  SEND AUTHORIZATION MESSAGE TO HOST
    (INCLUDING CUSTOMER DATA, TXN TYPE,
    AMOUNT INPUT, MICR LINE AND
    COURTESY AMOUNT READ)

32  RECEIVE AUTHORIZATION
    (AUTHORIZED)

33  DISPLAY IMAGE ON ATM DISPLAY

34  STORE IMAGE FILE AT ATM

35  PRINT CUSTOMER RECEIPT
    (MAY INCLUDE IMAGE)

36  RUN TRANSPORT

FIG. 11

37  SENSE CHECK

38  PRINT CANCELLATION DATA ON CHECK

39  MOVE CHECK TO DOCUMENT STORAGE

40  TAMP DOCUMENT STORAGE

41  IF DEPOSIT ONLY TXN GO TO 45
    IF CHECK CASHING TXN GO TO 42

42  DISPENSE CASH TO CUSTOMER
      PER AUTHORIZATION 43  (OPTIONAL) PRINT CUSTOMER VOUCHER
      FOR UNDISPENSED AMOUNT

44  PRINT RECEIPT FOR CASH DISPENSE

45  PROMPT FURTHER TRANSACTION
      (DECLINES)

46  TXN CLOSE (RETURN CARD)

 47  SEND COMPLETION TO HOST

FIG. 12

AUTOMATED BANKING MACHINE THAT OPERATES RESPONSIVE TO DATA BEARING RECORDS

CROSS REFERENCE TO RELATED APPLICATIONS

This application is a continuation of U.S. application Ser. No. 13/400,361 filed Feb. 20, 2012, now U.S. Pat. No. 8,387,867, which is a continuation of U.S. application Ser. No. 12/313,370 filed Nov. 19, 2008, now U.S. Pat. No. 8,118,217, which claims benefit pursuant to 35 U.S.C. §119(e) of U.S. Provisional Application 61/003,645 filed Nov. 19, 2007, and the disclosure of each above Application is herein incorporated by reference in its entirety.

TECHNICAL FIELD

This invention relates to automated banking machines that operate responsive to data read from user cards, which may be classified in U.S. Class 235, Subclass 379.

BACKGROUND OF INVENTION

Card activated automated banking machines are used to carry out banking transactions. Some automated banking machines are operated by consumers. Other automated banking machines may be operated by customer service representatives. For purposes of this disclosure an automated banking machine shall be deemed to include any apparatus that electronically carries out transactions including transfers of value. Automated banking machines may benefit from improvements.

OBJECTS OF EXEMPLARY EMBODIMENTS

It is an object of an exemplary form of at least one embodiment to provide an automated banking machine controlled by data bearing records.

It is a further object of an exemplary form of at least one embodiment to provide an automated banking machine system and method that accepts deposits and provides cash to a user.

It is a further object of an exemplary form of at least one embodiment to provide a deposit accepting apparatus.

It is a further object of an exemplary form of at least one embodiment to provide a deposit accepting apparatus for use in connection with an automated banking machine.

It is a further object of an exemplary form of at least one embodiment to provide a deposit accepting apparatus which can be used to accept, image and verify the authenticity of items.

It is a further object of an exemplary form of at least one embodiment to provide a deposit accepting apparatus that accepts both sheets and envelopes.

It is a further object of an exemplary form of at least one embodiment to provide a deposit accepting apparatus that can be used in existing automated banking machine systems.

It is a further object of an exemplary form of at least one embodiment to provide a deposit accepting apparatus that has greater reliability.

It is a further object of an exemplary form of at least one embodiment to provide a deposit accepting apparatus that is more compact.

It is a further object of an exemplary form of at least one embodiment to provide methods of accepting deposited items.

It is a further object of an exemplary form of at least one embodiment to provide a method for verifying the authenticity of deposited items.

It is a further object of an exemplary form of at least one embodiment to provide a method for verifying the authenticity of deposited check.

It is a further object of an exemplary form of at least one embodiment to provide a method for handling and storing deposited items.

It is a further object of an exemplary form of at least one embodiment to provide an apparatus and method for correlating image and transaction data to facilitate check processing.

Further objects of exemplary forms of embodiments will be made apparent in the following Detailed Description of Exemplary Embodiments and the appended claims.

The foregoing objects are accomplished in an example embodiment by a deposit accepting apparatus and method used in connection with an automated banking machine. Such an automated banking machine may be used to carry out transactions such as dispensing cash, checking account balances, paying bills and/or receiving deposits from users. Other types of automated banking machines may be used to purchase tickets, to issue coupons, to present checks, to print scrip and/or to carry out other functions either for a consumer or a service provider.

Automated banking machines may have the capability of accepting deposits from users. Such deposits may include items such as envelopes containing checks, credit slips, currency, coin or other items of value. Mechanisms may be used for receiving such items from the user and transporting them into a secure compartment within the banking machine. Periodically a service provider may access the interior of the machine and remove the deposited items. The content and/or value of the deposited items are verified so that a credit may be properly applied to an account of the user or other entity on whose behalf the deposit has been made. Such depositories may include printing devices which are capable of printing identifying information on the deposited item. This identifying information enables the source of the item to be tracked and credit for the item correlated with the proper account after the item is removed from the machine.

Automated banking machines may accept deposits from users in envelopes. Because the contents of the envelope are not verified at the time of deposit, the user's account generally is not credited for the deposit until the envelope is retrieved from the machine and the contents thereof verified. This may be done by persons who work for a financial institution. Delays in crediting a user's account may be experienced due to delays in removing deposits from machines, as well as the time it takes to review deposited items and enter appropriate credits. If the deposited items include instruments such as checks, further delays may be experienced. This is because after the instruments are removed from the machine they must be presented for payment to the appropriate institution. If the instrument is not honored or invalid the depositing customer's account cannot be credited for the deposit. Alternatively in situations where a credit has been made for a deposited instrument that is subsequently dishonored, the user's account must be charged the amount of the credit previously given. In addition the user may incur a "bad check" fee due to the cost associated with the institution having to handle a dishonored deposit. All of these complications may result in delays and inconvenience to the user.

Another risk associated with depositories in automated banking machines is that deposited items may be misappropriated. Because deposited checks and other instruments are not cancelled at the time of receipt by the automated banking machine, they may be stolen from the machine and cashed by unauthorized persons. Criminals may attempt to break into the machine to obtain the items that have been stored in the depository. Alternatively persons responsible for transporting items from the machine or persons responsible for verifying the items may misappropriate deposited instruments and currency. Alternatively the handling required for transporting and verifying the contents of deposits may result in deposited instruments being lost. Such circumstances can result in the user not receiving proper credit for deposited items.

To reduce many of the drawbacks associated with depositories which receive deposits in the form of envelopes or other items, automated devices that can read and cancel deposited instruments may be used. An example of such a device is shown in U.S. Pat. No. 5,540,425 which is owned by a wholly owned subsidiary of the Assignee of the present invention. Such devices are capable of reading the coding on checks or other deposited items. For example bank checks include magnetic ink coding commonly referred to as "MICR." The MICR coding on a check can be used to identify the institution upon which the check is drawn. The coding also identifies the account number of the user and the check number. This coding may appear in one or several areas on the instrument. Reading this coding in the automated banking machine enables the machine operator to determine the source of checks or other instruments that have been presented.

Imaging devices may also be used in processing instruments. Such imaging devices may be used to produce data corresponding to an image of the item that has been deposited. This image may be reviewed to determine the nature of the deposited item, and along with the information that can be obtained from the coding on the instrument allows processing of the credit to the user much more readily. Automated instrument processing systems also may provide the capability of printing an indication that the check or other instrument has been deposited and cancelled after it has been received. This reduces the risk that the instrument will subsequently be misappropriated and cashed by unauthorized persons.

While automated deposit accepting and processing devices provide many advantages and benefits, such devices may also have drawbacks. One drawback is that instruments must often be precisely aligned for purposes of reading MICR coding or other indicia which is included on the instrument. This may require special mechanisms to precisely position and align the instrument with the reading devices included in the device. A further drawback may be that such devices are required to turn and reorient the deposited instrument. The mechanisms for doing this can be complex. Such complex mechanisms may encounter reliability problems due to the precise tolerances that must be maintained. Further difficulty is added by the fact that instruments that are received may be creased, torn or soiled. Handling such items may be difficult. Instruments becoming jammed in such mechanisms may result in costly repairs and downtime.

A further drawback associated with some imaging systems in automated banking machines is that it is not practical to transmit an image of a deposited instrument for review and analysis at the time it is received. This is because the time and bandwidth necessary to capture and transmit an image of the deposited instrument may be longer than desirable. Extended transaction times may discourage the use of the machine. A further drawback is that even when images may be transmitted sufficiently quickly, the operator of the system is required to invest in the resources necessary to analyze the transmitted image and make a determination as to whether the deposited item should be accepted as valid or not. Such capabilities may include employees who must review the image and determine whether the item is genuine by comparison to data or other information such as examples of the customer's signature. Alternatively automated systems may be provided for analyzing the image of the instrument or the data printed or typed thereon. Providing such capabilities may be costly for the systems operator. Advances in photocopy technology also may make it difficult for operators of such systems to distinguish between genuine items and reproductions. As a result even with carefully operated and administered systems there is a risk that deposited items which are not genuine may be accepted.

Certain standardized techniques have been developed for automated banking machine systems. The electronic message flows and formats that may be used for automated teller machines (ATMs) for example may not include the capability of transmitting a document image as part of the standard message which requests that a deposit transaction be authorized. As a result it has been difficult to achieve real time check verification and cashing in widely distributed systems. Further, in some systems it is difficult to readily correlate an image file with the particular transaction with which the image file is associated.

An example embodiment by a deposit accepting apparatus used in connection with an automated banking machine to achieve one or more of the objects discussed previously, may include a transport section. The transport section includes a transport which accepts items of variable thickness. Such items may include relatively thin single sheet-like items and relatively thick irregular shaped items such as deposit envelopes. The transport section includes a biasing mechanism for reliably engaging deposited items with moving mechanisms such as belts or rollers in the transport section. The deposited items are reliably engaged with such moving members to assure that the deposited item is moved through the transport section.

The example transport section further includes an analysis module adjacent thereto. In the example embodiment the analysis module serves as an imaging device and is operative to analyze documents passing through the transport section. For purposes of this application an imaging device includes any device that is operative to enable the generation of image data which corresponds to a visual appearance of at least a portion of the document. In addition the analysis module is operative to sense for features and characteristics of the document which may be used to identify the document type. Alternatively or in addition the analysis module may operate to sense properties of a deposited document which distinguish acceptable or genuine documents from unacceptable documents.

In the example embodiment the transport section of the deposit accepting apparatus is connected to a deposit holding module. The deposit holding module includes at least two compartments therein. In the example embodiment the deposit holding module operates to move the compartments relative to the transport section and to selectively place an outlet from the transport section in communication with a desired one of the compartments. For example when an envelope type deposit is accepted in the transport section, the deposit holding module operates so that the envelope is moved through the transport and deposited into a compartment which is adapted for holding envelopes. Alternatively when a check or other sheet-like deposit is moved through the transport section, the deposit holding module operates so that the sheet moves from the transport section into a compartment which is designated for holding the particular type of sheet. Of course in alternative embodiments many types of holding areas may be provided for many types of documents.

In an example embodiment described herein, a deposit accepting apparatus and method is used in connection with an automated banking machine. The automated banking machine includes one or more computers therein (alternatively referred to herein as processors or controllers) which operate to control the transaction function devices within the automated banking machine including aspects of the deposit accepting apparatus. When a customer at the automated banking machine wishes to deposit an envelope or similar deposit containing item in the machine, the controller enables the customer to place the deposited envelope in the machine so that it may engage the transport section. The computer also operates so that the deposit holding module places the compartment for holding deposited envelopes in communication with the transport section. The user is enabled to engage the deposit envelope with the variable force driving section which the computer causes to operate in a limited slip mode. Once the computer senses that the deposit envelope has been moved into the transport section the variable force driving section may be controlled so that the envelope is more positively engaged with the moving members in the transport. The deposit envelope is then moved through the transport past the analysis module.

In the example embodiment as the deposit envelope passes through the transport section the computer causes a printing mechanism to print identifying information on the envelope. The example embodiment of the invention includes a printing mechanism which senses that the envelope has moved into proximity with the printing mechanism. In response to sensing this condition the computer causes the printing mechanism to move relative to the envelope so that printing may be reliably conducted thereon. The movement of the printing mechanism provides greater assurance that the envelope will not catch on or be damaged by the printer mechanism. Once printing has been conducted, the computer causes the printing mechanism to be returned to a standby condition.

Upon passing through the transport section the deposited envelope passes into the designated compartment. The entrance to the designated compartment is aligned with the outlet from the transport section through operation of the deposit holding module. Once the deposited envelope has passed into the compartment within the module it is held therein until accessed by authorized personnel. Suitable locking mechanisms and security procedures are provided so that only authorized personnel are enabled to access the deposit. The identifying information that is printed on the envelope enables the association of the deposited items with the particular customer or user of the automated banking machine.

In the example embodiment when the user wishes to deposit an instrument such as a check, the automated banking machine operates to verify the authenticity of the check and to read data therefrom. In response to the user first providing appropriate identifying inputs and information, the computer in the automated banking machine operates to enable a deposited item to engage the transport section of the apparatus. The computer operates such that the deposited item is initially engaged in a limited slip manner by the variable force driving section and once sensed as substantially within the transport, operates to move the check in a generally nonslip manner.

The deposited item is moved in the transport section in the example embodiment in a first direction past sensors which enable the computer to determine its length. Once the length of the deposited item is determined by moving it in the first direction, movement of the deposited item is stopped and the item is transported in an opposed direction past the analysis module. In the example embodiment movement of the check past the analysis module enables the collection of data corresponding to an image of the check as well as the sensing of magnetic properties in areas thereof. The example embodiment does not require that the deposited check be perfectly aligned in the transport section for reading the check.

In an example embodiment the computer operates responsive to inputs provided by the customer or responsive to other actions to recall from memory data representative of a template which shows the layout of information included on the particular type of item being deposited. The computer operates to adjust the image data gathered from the deposited item and to place it in correspondence with the template. Characters are then analyzed from at least one selected area of the image in accordance with the template to determine if such characters can be accurately identified. If the computer determines that these particular characters cannot be accurately identified, the image data is then moved relative to a template and further attempts are made to determine if data from the area of the template can be recognized. In the example embodiment the data corresponding to the image of the check may be moved 180° relative to the first attempt. In this way if the check is deposited in for example, a face up orientation, either of two possible orientations for the check may be quickly analyzed. Of course alternative approaches may be used and if after a set number of attempts it is determined that the data from a particular area of the check cannot be analyzed with a sufficient degree of accuracy, further attempts may be discontinued and the deposited item returned to the customer.

Once data from at least one area of the deposited item is determined with a sufficient level of assurance, data from at least one other area of the item as determined by the template may be analyzed. In the case of a check, the automated banking machine is operative to determine the amount of the check as written in the courtesy amount area. The computer operates to analyze the characters and determine if the amount can be determined with a sufficient level of assurance. In the example embodiment the computer operates to locate and identify the courtesy amount using certain landmark rules which identify the landscape and layout of the courtesy amount area. If the computer decides that the characters in the courtesy amount area may be determined with a sufficient level of assurance, further processing of the check is enabled to be conducted. In the alternative if the amount cannot be read with a sufficient level of assurance, the deposited check may be returned to the customer.

In the example embodiment the computer operates to analyze the characters in the MICR line on the check as well as the courtesy amount. This data provides both the data sufficient to identify the institution on which the check is drawn as well as the account number of the entity on whose account the check is drawn. The MICR line also includes data representative of the check number and other information. The courtesy amount which is analyzed in the example embodiment indicates the amount of the check which has been presented. This information is often sufficient for a financial institution or other entity operating the automated banking machine to charge the appropriate entity for the amount of the check presented. In alternative embodiments the computer may operate to analyze characters located in the area of the check in which the legal amount is written. The amount determined as the legal amount of the check may then be compared to the courtesy amount for purposes of determining whether both amounts have been read properly. Alternatively or in addition, the MICR line on the check may include amount data in the case of some checks. In these cases the computer may operate to conduct additional comparisons between the analyzed amounts to verify that the amounts correspond and therefore have been read accurately, or to determine discrepancies that may indicate that a check has been tampered with or other conditions that may suggest that it is not advisable for the machine to accept such a check.

In the example embodiment the depository apparatus is also operative to sense for the presence of magnetic coding in appropriate locations on the check. For example the computer is operative to verify that the ink in the area which has been identified as including the MICR coding has magnetic properties. This may provide greater assurance that the document presented is in fact a genuine printed check and not a photocopy of a check. The computer may operate in addition to sense magnetic or other properties from various areas appropriate for the deposited document depending on data stored in memory. Further in some alternative embodiments the computer may operate to look for magnetic or other properties in areas of the check where such properties would not be appropriate. Such sensing may reduce the risk of the machine accepting fraudulent checks. Other embodiments may include read heads or other devices for reading features on a check corresponding to MICR line characters or other features magnetically.

In some embodiments the machine may operate to capture a complete image of one or both sides of each check or other instrument. In some embodiments image data may be stored in correlated relation with data related to the transaction at the machine. In some embodiments the image data, with or without associated transaction data, may be delivered by the machine to appropriate computers so that check processing may be conducted using the electronic image of the check rather than paper documents. In some embodiments check images may be stored at the machine and later delivered to appropriate systems for check processing. In other alternative embodiments check images may be transmitted to other computers during the transaction so that such computers may further analyze the check image data.

In an example embodiment, the computer operating in the automated banking machine is operative to include data representative of the check data corresponding to information which corresponds to indicia on the check such as amount and MICR line data, into an electronic message requesting authorization of the machine transaction. This authorization message is transmitted to an appropriate host computer. The computer analyzes the data to verify that the user operating the machine is authorized to conduct a deposit, check cashing or other transaction. In addition the host computer may operate to verify that the check data corresponds to data input by the customer. The host computer may further operate to determine or communicate with other computers to verify that the account data corresponding to the check corresponds to a valid account, that the check is not subject to a stop payment order and/or that there are sufficient funds in the account upon which the presented check is drawn to provide payment therefor.

In response to the host computer determining that the requested check cashing transaction is suitable to be carried forward, an authorization message is returned from the host computer to the automated banking machine. The automated banking machine operates responsive to instruction data included in the authorization message to cause the check to be moved through the transport section past the printing mechanism. The printing mechanism operates to print indicia on the check. This printed indicia may indicate that the check has been cancelled as well as indicate the particular account of the user to which the check has been credited. In an example embodiment the printing mechanism operates in the manner previously discussed to move into position in response to sensing the check adjacent thereto. This again minimizes the risk of damage to the printing mechanism or the check.

The computer also operates to control the deposit holding module such that the appropriate compartment therein accepts the deposited check. In the example system the deposit holding module moves the compartment for holding the check into alignment with the outlet of the transport section. The deposited check is then held within the compartment until it is accessed by authorized personnel. Further, in the example embodiment the deposit holding module is operative after receipt of the check into the appropriate compartment to move a tamping member in the compartment. The tamping member operates to assure that the deposited check as well as other checks in the compartment are properly tamped into position so as to reduce the likelihood of interference with acceptance of subsequent checks. The deposited check is then held in the appropriate compartment until removed by authorized personnel.

In an example embodiment, the automated banking machine is programmed to correlate the transaction identification data with the image data related to the particular check received in the transaction. At a time after the machine has generated data corresponding to an image of the check, an image message is generated by the machine and sent to a remote computer. In the example embodiment the image message includes the transaction identification data as well as the data representative of images of the front and back sides of the check in a single message. In the example embodiment the image message is sent to an image server which is operative to receive and process the image and transaction data. The example image server is operative to tabularize the transaction data related to machines operated by a particular entity and to make the information and images related to transactions conducted by automated banking machines associated with that entity available to authorized individuals. This may be done through password protection, digital certificates or other security methodologies. Further in other alternative embodiments the image server or other connected computers may be operative to send information included in the image message and/or image data to a clearing house or other institution for purposes of achieving settlement between an entity upon which the check is drawn and another entity holding an account for an entity to which the check is payable. In alternative embodiments the image server may operate to modify image data as appropriate to indicate that the check is an electronic substitute check. Further the image data may be transmitted and processed in lieu of a paper check so as to return evidence related to the proper cashing and cancellation of the check through the institution on which the check is drawn, and eventually to the maker of the check. Of course these approaches are examples and in other embodiments other approaches may be used.

While the example embodiment is used for accepting envelopes and checks, other embodiments of the invention may accept only checks or may process other types of instruments. These include for example utility bills, drivers' licenses, gaming materials, tax documents and other items. Such items may be analyzed by the analysis module described in the example embodiment for image and magnetic properties. Alternatively such items may be analyzed for other properties which may be indicative of their genuineness and value. Further as can be appreciated, while the example embodiment accepts deposited items into the machine, other embodiments may accept items from a user, analyze them and return them to the user. This includes not only items which are considered unacceptable as is discussed in the example embodiment, but may also include items such as drivers' licenses which are returned to the user after an image or analysis is made thereof. Numerous types of systems and methods are encompassed within the scope of the present invention.

An example embodiment may include an apparatus comprising at least one magnetic sensor, at least one optical sensor, at least one transport, and at least one processor inoperative connection with the at least one transport, the at least one magnetic sensor, and the at least one optical sensor. The at least one transport is operative to move a check across the at least one magnetic sensor and the at least one optical sensor. The check includes a first face and an opposed second face. The at least one magnetic sensor is operative to detect magnetic signals from at least one face of the check as the check crosses the magnetic sensor. The at least one optical sensor is operative to detect optical signals from at least one face of the check.

In this described embodiment, the at least one processor is operative to generate optical data and magnetic data corresponding to optical and magnetic signals of the check respectively. The at least one processor is operative to determine a plurality of portions of the magnetic data which correspond respectively to a plurality of predetermined areas on at least one face of the check responsive to the optical data. The at least one processor is operative to determine levels of magnetic signals corresponding to each of the predetermined areas on the at least one face of the check responsive to the plurality of portions of the magnetic data. In addition the at least one processor is operative to determine whether the check is acceptable to deposit responsive to the determined levels of magnetic.

In one embodiment, the described apparatus may correspond to an automated banking machine including a cash dispenser and a deposit accepting apparatus. The deposit accepting apparatus device includes the at least one magnetic sensor, the at least one optical sensor and the at least one transport.

An example embodiment may include the deposit accepting apparatus may include a scanner device operative to capture one or more color images of each side of a document. Such images are comprised of a two-dimensional grid of pixels, which is representative of the visual features of the surfaces of the document. To generate the grid of pixels for an image, the scanner is operative to scan the document one transverse section at a time (referred to herein as a scan line) along the surface of the document. Each scan line captured by the scanner corresponds to a different row of pixels in the resulting image. By capturing scan lines incrementally along the length of a document, the entire surface of the document may be scanned into the two-dimensional grid of pixels.

In an exemplary embodiment, the scanner device may be operative to illuminate a document with different colored light sources (e.g., red, blue, green). The scanner device, may illuminate the document with only one color at a time, when capturing a scan line. However, rather than repeating the capture of the same scan line in the same location on a document, for each of the colored light sources, an example embodiment may capture a scan line using only one of the colored light sources. The next adjacent scan line (captured along the length of the document), may be captured using only one of the colored light sources as well, but which colored light source is different than the colored light sources used for the previous scan line. Thus the sequence of scan lines that comprise a document from one end to its opposite end, may be captured in a predetermined sequence of different colors such as (red, green, blue, red, green, blue, red, green, blue . . . ).

In this embodiment at least one computer processor in the machine is operative to carry out an extrapolation calculation for the non-scanned colors for each pixel for each scan line from pixels in the non-scanned colors in adjacent and/or relatively near scan lines. To increase the accuracy of an extrapolation calculation for non-scanned colors of a particular pixel, the adjacent/near pixels in the non-scanned colors that are in scan lines relatively closer to the particular pixel may be given a higher weight in the extrapolation calculation than those pixels that are in scan lines relatively farther away. For example, in an extrapolation calculation for non-scanned colors for pixels in a particular scan line, the weight accorded to the scanned pixels (in a different color) in a scan line immediately adjacent the particular scan line is given twice the weight accorded to pixels (in the same different color) of a scan line two scan lines away on the opposite side from the particular scan line.

In alternative example embodiments, two colors (via two of the three colored light sources) may be initially scanned for each scan line. The non-scanned color for the pixels in a scan line may be extrapolated from the pixels scanned in that color in the surrounding scan lines.

BRIEF DESCRIPTION OF DRAWINGS

FIGS. 9-12 describe an example embodiment of the logic flow executed by an automated banking machine in accepting a check through the deposit accepting apparatus.

DETAILED DESCRIPTION OF EXEMPLARY EMBODIMENTS

Figure 1:
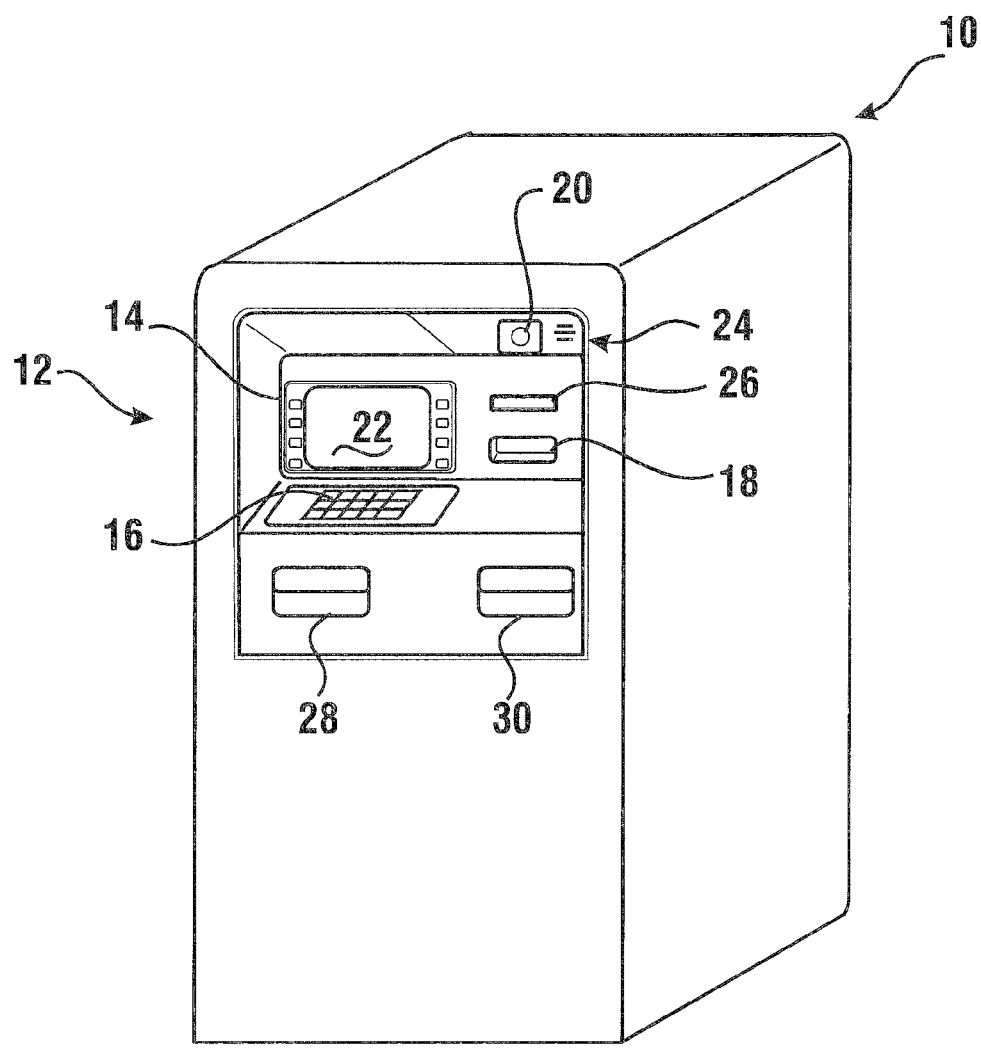
FIG. 1 is an isometric view of an example automated banking machine which may be used in connection with a deposit accepting apparatus and method.

Each of U.S. Pat. No. 6,554,185, and U.S. patent application Ser. No. 11/371,330 are hereby incorporated herein by reference in their entirety. Referring now to FIG. 1, there is shown therein an example embodiment of an automated banking machine 10 which includes an example deposit accepting apparatus and which performs at least one operation. Automated banking machine 10 may correspond to an automated teller machine (ATM). However it should be understood that the concepts and features disclosed herein may be used in connection with various types of automated banking machines and devices of other types. Automated banking machine 10 includes a user interface generally indicated 12. User interface 12 includes input and output devices. In the example embodiment the input devices include a plurality of function buttons 14 through which a user may provide inputs to the machine. The example input devices further include a keypad 16 through which a user may provide numeric or other inputs. A further input device in this example embodiment includes a card reader schematically indicated 18. Card reader 18 may be of the type used for reading magnetic stripe cards, smart cards, RFID tokens or other articles presented by a user. Another input device on the example machine includes an image capture device 20. The image capture device may be a camera or other device for capturing the image of a user or the surroundings of the machine. The example embodiment may include biometric reading devices. Such devices may include an imaging or reading device such as a fingerprint reader, iris scan device, retina scan device or other biometric input. It should be understood that the camera mentioned may serve as a biometric reading device in some embodiments.

The user interface 12 also includes output devices. In the example embodiment shown in FIG. 1 the output devices include a display 22. Display 22 includes a visual output device such as a CRT or LCD for providing messages and prompts to a user. These messages and prompts may be responded to by inputs from the user through the function buttons 14 adjacent to the display or by inputs through the keypad 16 or through other inputs. A further output device in the example embodiment includes an audio output device schematically indicated 24. The audio output device may be used to provide audible outputs to the user. A further output device in the example embodiment includes a printer. The printer may be used to provide outputs in the form of receipts or other items or information to the user. The printer is in connection with a printer outlet in the user interface indicated 26 in FIG. 1.

It should be understood that the input and output devices shown are examples and in other embodiments other types of input and output devices may be used. Such input and output devices commonly receive information which is usable to identify the customer and/or their accounts. Such devices are also operative to provide information to a user and to receive instructions from a user concerning transactions which are to be carried out through use of the machine. Various forms of user interfaces and input and output devices may be used in connection with various embodiments.

In the described example embodiment the automated banking machine 10 includes a cash dispensing mechanism which is alternatively referred to herein as a cash dispenser. The cash dispensing mechanism is selectively operated to enable the dispensing of cash to authorized users of the machine. Cash is provided to the users through a cash outlet indicated 28. A further feature of the example embodiment of the invention is the ability to accept deposits through the automated banking machine. The machine includes a deposit accepting opening 30. In the example embodiment the machine is enabled to accept deposits in the form of sheets, envelopes and other items as later discussed. In some embodiments the machine may have structural components like those shown in U.S. Pat. No. 6,010,065 the disclosure of which is hereby incorporated herein by reference.

Figure 2:
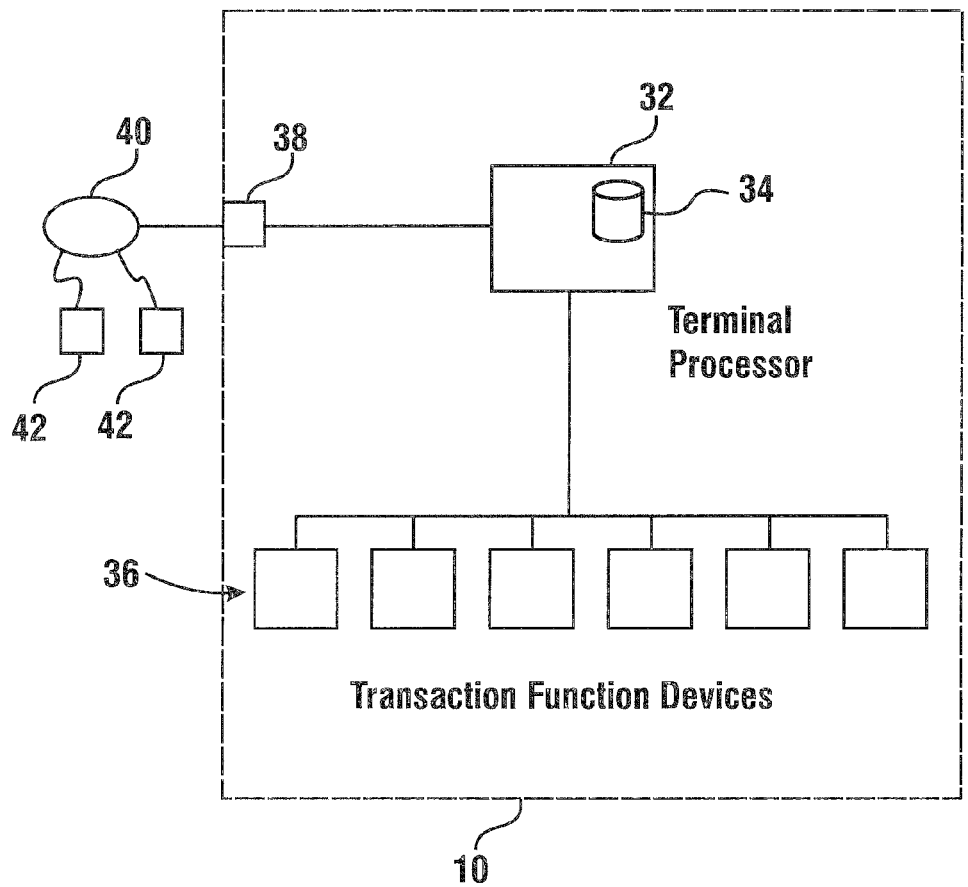
FIG. 2 is a schematic view of components included within an automated banking machine of the type shown in FIG. 1 and a system in which the automated banking machine is used.

FIG. 2 shows a schematic view of the computer architecture associated with automated banking machine 10 and a first example system in which it is used. The machine includes one or more computers therein which computer or computers are alternatively referred to herein as a controller, processor or processors. The one or more computers in the example embodiment are schematically represented by a terminal processor 32. The terminal processor is in operative connection with one or more data stores schematically represented 34. The terminal processor may comprise one or more computers that operate to control transaction function devices 36 which are included in the machine. These transaction function devices include devices which operate in the machine to carry out transactions. Transaction function devices may include, for example, currency dispensing mechanisms, currency presenters, currency acceptors, currency validators, item dispensing devices, card readers, printers, depositories, other input and output devices and other devices. Transaction function devices may further include cameras, sensors, image capture devices and other items. Transaction function devices may also include one or more processors. The particular character of the transaction function devices depends on the particular capabilities for carrying out transactions to be provided by the automated banking machine.

In the example embodiment automated banking machine 10 exchanges messages through a communication interface 38 with a communications network 40. Network 40 may be one or more types of data communications networks, including a phone line, data line, lease line, frame relay, wireless network, telecommunications network, local area network, wide area network or other medium for communicating messages to and from the machine 10. The communications interface provided is suitable to work in connection with the particular type of network(s) to which the machine is connected. In the example embodiment the machine may be connected to a network which communicates with a plurality of machines, such as Cirrus® or Plus®, or other debit card network. Of course in other embodiments other suitable networks for processing credit, debit or other types of online transactions may be used including the Internet.

As schematically represented in FIG. 2, network 40 is in operative connection with one or more host computers 42, also referred to herein as host banking. Host computers 42 in the example embodiment are operative to authorize transaction requests which are made by users at the automated banking machine 10. The machine is operative to deliver to the host computer data identifying the user and/or their account and the particular transactions that they wish to conduct. The request is routed through the network to a host computer that can evaluate and/or authorize the request. The appropriate host computer receives and analyzes this data and returns to the machine a message which indicates whether the transaction requested is authorized to be conducted at the machine. The message returned may also include one or more instructions that cause the machine to carry out one or more transaction functions. In response to receiving a message indicating that the transaction should proceed, the processor in the machine operates the transaction function devices to carry out the requested transaction. If the transaction is not authorized, the user is so informed through the display or other output device and the transaction is prevented. The machine is also operative in the example embodiment to send to the host computer authorizing the transaction, a completion message which includes data indicative of whether the transaction was able to be carried out successfully. Upon receiving the information that the transaction was carried out, the host computer is operative to take appropriate action such as to credit or debit a user's account. It should be understood that this system shown in FIG. 2 is an example and in other embodiments other approaches to operating automated banking machines and authorizing transactions may be used.

Figure 3:
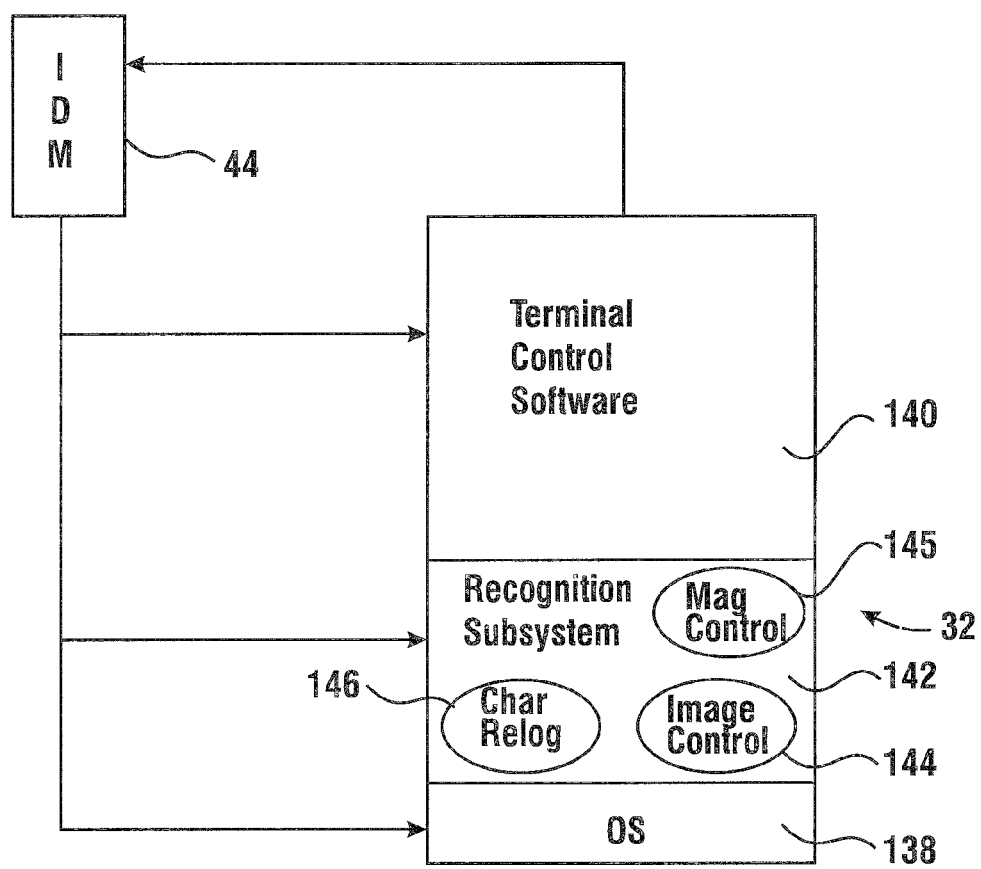
FIG. 3 is a schematic view of software components used in connection with the automated banking machine shown in FIG. 2.
Figure 4:
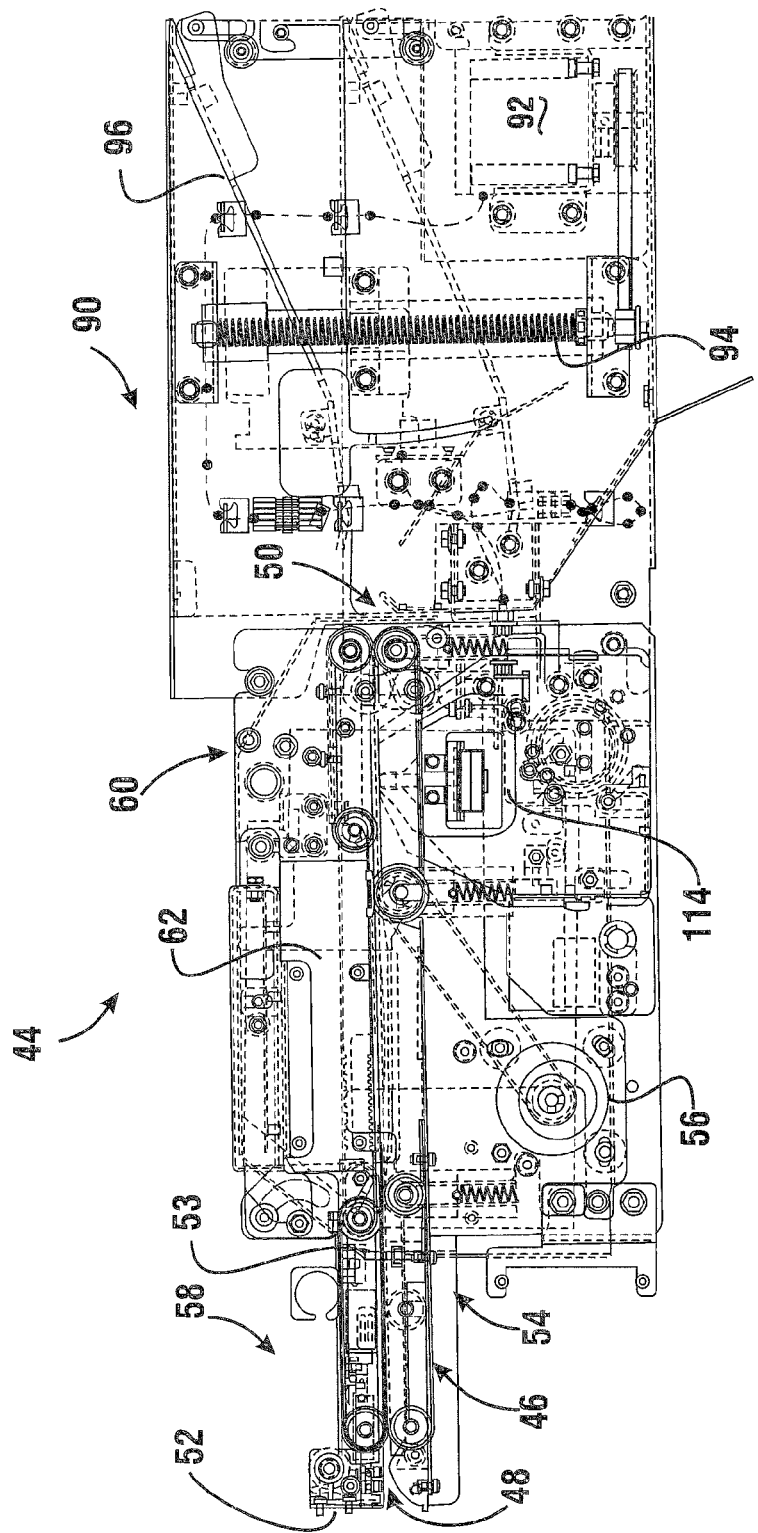
FIG. 4 is a side view of a deposit accepting apparatus used in connection with an example embodiment.
Figure 5:
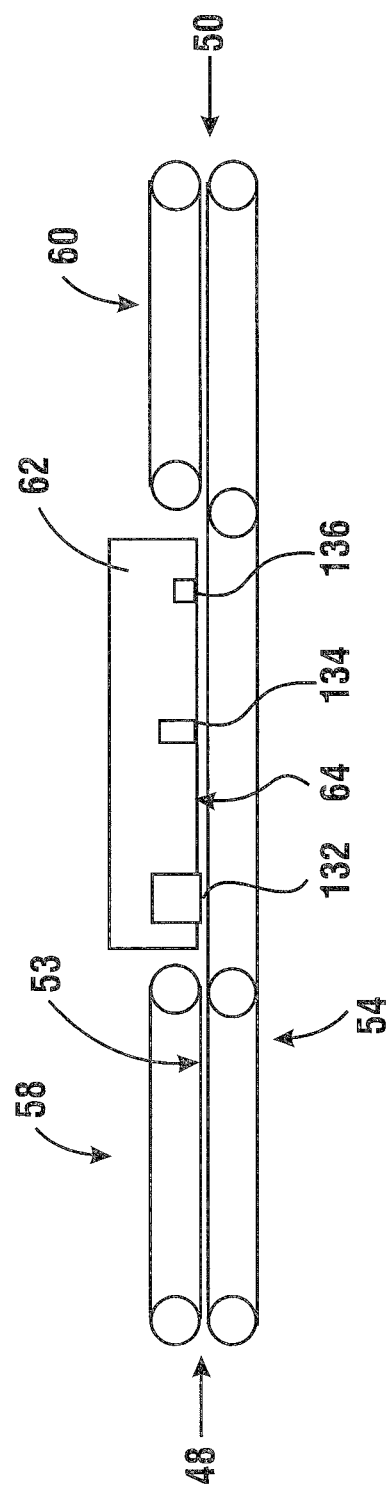
FIG. 5 is a schematic view of the deposit accepting apparatus shown in FIG. 4.
Figure 6:
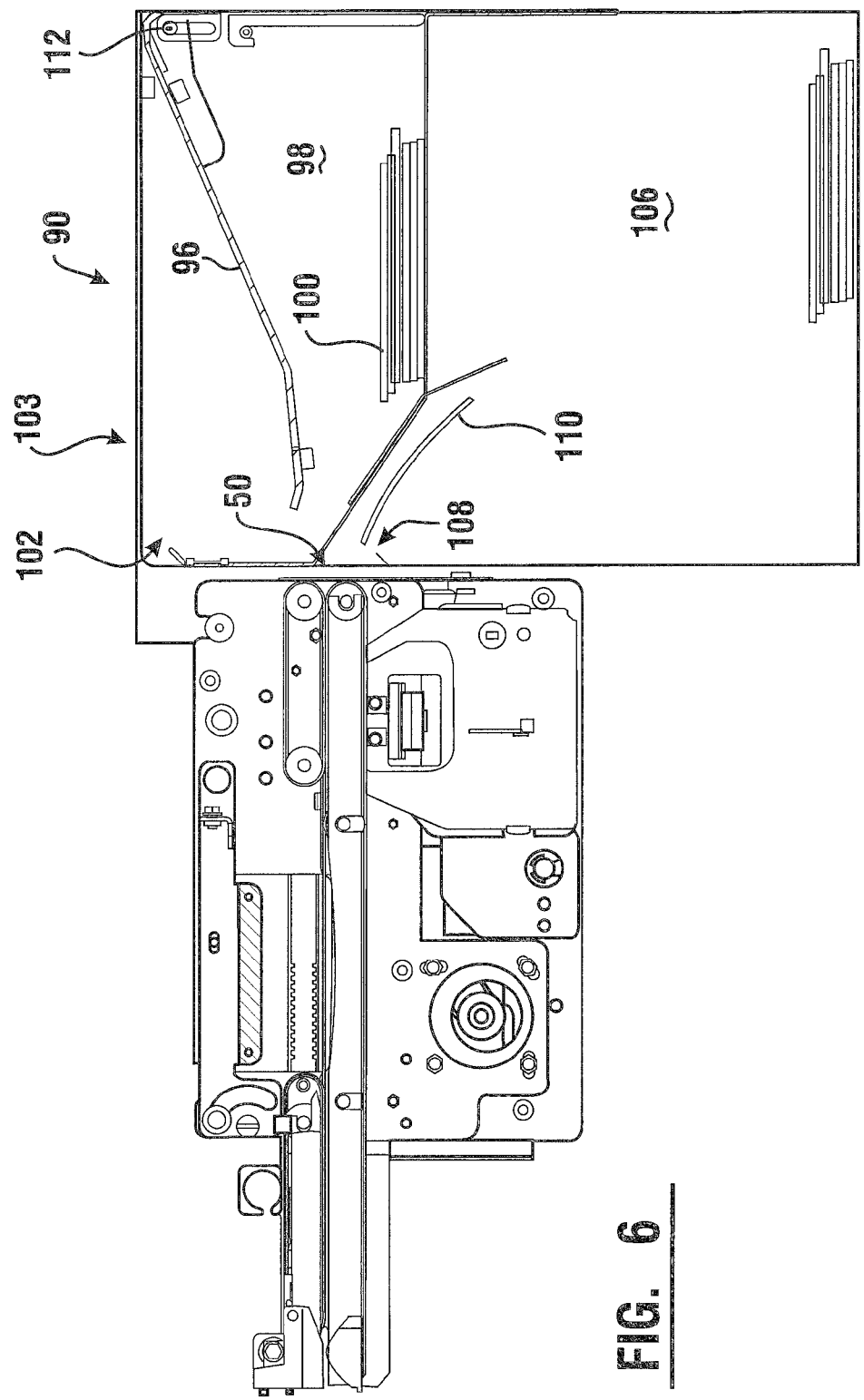
FIG. 6 is a side view of the deposit holding module of the transport apparatus with the deposit holding module in a condition for accepting an envelope deposit into an envelope holding compartment.

In the described example embodiment the transaction function devices include a deposit accepting apparatus. The example deposit accepting apparatus is capable of accepting deposited items such as envelopes as well as sheets and documents such as checks. This deposit accepting apparatus in alternative embodiments may be capable of accepting and analyzing other items such as papers, instruments, billing statements, invoices, vouchers, wagering slips, receipts, scrip, payment documents, driver's licenses, cards and items which may be moved in the deposit accepting apparatus. Alternative embodiments of a deposit accepting apparatus may accept only selected ones of deposit items. The example deposit accepting apparatus may alternatively be referred to herein as an "intelligent depository module," "depository module" or "IDM." An example embodiment of the IDM 44 is shown in FIG. 3 and example mechanical components thereof are shown in FIGS. 4-6. It should be understood that for purposes of this application, a deposit accepting apparatus or device encompasses any mechanism that accepts an item into an automated banking machine.

As shown in FIG. 4 IDM 44 includes a transport section 46. Transport section 46 extends in generally a straight path from an inlet 48 to an outlet 50. Inlet 48 is positioned adjacent to a deposit accepting opening 30 through the body of the automated banking machine 10. Access to the transport section 46 from the outside of the machine may be controlled by a gate 52 or other suitable blocking mechanism which operates under the control of the terminal processor 32. The terminal processor operates to open the gate only when an authorized user of the machine is to provide items to or to receive items from the transport section of the IDM.

The transport section 46 of the IDM includes a plurality of belts or other moving members 54. Moving members 54 operate to engage items deposited into the transport section and to move deposited items in engagement therewith. The moving members are moved in response to one or more drives schematically indicated 56. In this example embodiment an inlet transport section 58 moves deposited items between upper and lower belt flights (see FIG. 5). Similarly, deposited items are also moved through an outlet transport section 60 in sandwiched relation between upper and lower belt flights. Between the inlet and outlet transport sections deposited items are moved past an analysis module 62. In this example embodiment deposited items are moved adjacent to the analysis module in engagement with moving members that act on the lower side of the deposited item. In this way the deposited item moves in close proximity to the analysis module and in sandwiched relation between a lower face 64 of the analysis module and the upper face of the moving members. Of course it should be understood that this configuration is an example. In other embodiments additional analysis modules may be provided so that both sides of an item are analyzed. Analysis modules or discrete devices for activating indicia to facilitate sensing, as well as for sensing indicia on items, may be provided as necessary to read indicia from items handled by the banking machine.

The example embodiment further includes a deposit holding module schematically indicated 90 (see FIGS. 4 and 6). In the example embodiment the deposit holding module includes a plurality of compartments which are moved relative to the outlet 50 of the transport section to enable items to be passed from the transport section into a selected compartment. The deposit holding module includes a drive 92 which is part of a translation mechanism 94 of the screw type. The translation mechanism operates to move the compartments in a generally vertical direction relative to the outlet 50 in the transport section. The deposit holding module further includes a tamping member 96 which is movable in the compartment and operates to tamp sheets held in a sheet holding compartment so as to reduce the volume of sheets held therein until the items may be removed.

The operation of the deposit holding module 90 in connection with the example embodiment is represented in FIG. 6. As shown in FIG. 6 sheet holding compartment 98 in the deposit accepting module 90 is adapted for holding sheets 100 of one type such as cancelled checks or other items accepted in the machine. The sheet holding compartment 98 includes an opening 102 in an upper area thereof generally indicated 103. Opening 102 may be selectively moved responsive to signals from the terminal processor and operation of a drive, to be in communication with outlet 50. The tamping member 96 may also be selectively moved upward such that a sheet leaving the transport section through the outlet such as a sheet, may be passed into the sheet holding compartment 98.

When deposit envelopes are to be accepted, the controller responsive to at least one input through the user interface indicating an envelope deposit, may operate a drive to move the position of the compartments within the deposit holding module so that an envelope holding compartment 106 is placed in communication with the outlet 50 of the transport section. This is accomplished as represented in FIG. 6 by bringing an opening 108 to compartment 106 into alignment with the outlet 50. This enables an envelope deposit such as an envelope schematically represented 110 in FIG. 6 to be moved into the envelope holding compartment 106.

It should be noted that the movement of the compartments relative to the outlet enable selectively aligning the openings to the various compartments with the outlet from the transport. This minimizes the amount of handling and manipulation of the deposits that is necessary to move them through the deposit accepting mechanism. This increases reliability and speed of the example embodiment. Further in the example embodiment the controller is enabled to selectively move the position of the tamping member 96 relative to the sheets in the sheet holding compartment 98. The tamping member is enabled to move about a non-fixed pivot 112 between positions such as those shown in FIG. 6. The ability to downward dispose the tamping member relative to the sheet stack enables compressing the stack of sheets 100 that may be present in the sheet holding compartment so as to reduce their volume. This enables accepting sheets more reliably and holding more sheets in the sheet holding compartment before the accumulated sheets need to be removed. It should be noted that the movement of the tamping member 96 is achieved through an operative interconnection with the translation mechanism which moves the compartments as shown in FIG. 4. Further the tamping member is connected to the body of the deposit holding device through the nonfixed pivot connection so that the action of the tamping member is enabled to accommodate various sized stacks of sheets within the sheet holding compartment.

In alternative embodiments provisions may be made for permanently defacing and/or destroying accepted items such as cancelled checks. This may be appropriate, for example, in situations where an electronic image of the check has been captured and the electronic image serves as an image replacement document for the paper check. In such embodiments, after the check has been imaged either immediately or after a determined holding period, the cancelled check may be suitably destroyed. Various methods for destruction may include, for example, shredding, chemical treatment, incineration or other approaches. Of course combinations of such approaches may also be used. Further in some example embodiments provision may be made to transfer the remnants of destroyed checks out of the housing of the banking machine and into a suitable waste receptacle. Such a waste receptacle may be provided, for example, at the rear of the machine or other location that can be connected to an opening from the machine. Thus for example in one example embodiment checks that have been imaged and cancelled may be treated with a suitable ink or other material to obliterate information on the check, and the check shredded by a suitable paper shredding mechanism. Thereafter the remnants of the check may be transported by rollers, belts, air pressure or other suitable means out through an opening of the machine into a waste receptacle. This example approach enables the machine to run for an extended period of time without having to remove cancelled checks from the interior of the housing. Of course it should be understood that this approach is merely an example and in other embodiments other approaches may be used.

Referring again to FIG. 4 the example embodiment of the IDM 44 includes a printing mechanism 114. The printing mechanism is operative to enable printing indicia on deposited items responsive to control of the terminal processor. Such printing may be used in the example embodiments to print identifying indicia on deposited envelopes or documents. Alternatively such printing may be used to indicate the cancellation or acceptance of items placed into the machine by a user and which are stored in the machine or returned to the user from the machine. It should be understood that although in the example embodiment the printer is shown on a first side of the transport path, in other embodiments the printer may be positioned on an opposed side of the transport path. Alternatively printing devices of similar or different types may be positioned on both sides of the transport path in some embodiments. It should further be understood that the particular configuration of the printing mechanism is an example and in other embodiments of the invention, other types of printing mechanisms may be used.

In the example embodiment the analysis module 62 includes optical scanning sensors schematically indicated 132 in FIG. 5. The analysis module may serve as a check imaging device. Scanning sensors 132 are operative to generate an image of documents that move adjacent to the analysis module. In the example embodiment the scanning sensors scan generally the entire transverse path through which documents may travel in the transport section. The scanner in the described embodiment generates radiation in the visible range and resolves images at approximately 240 dots per lineal inch. The scanning sensor is also operative to have a focal length which corresponds to the distance that the scanned documents are disposed from the surface of the sensor as they pass the analysis module. In the example embodiment the scanning sensor 132 has a focal length of about 4 millimeters. Of course in other embodiments other types of scanning sensors may be used. Such other types of sensors may include emitters and sensors for sensing radiation at discrete frequencies in the visible or non-visible range. In addition multiple sensor types may be used on one or both sides of documents. Various types of sensors may be used. The imaging device of the example embodiment is operative responsive to an associated processor to produce image data, which comprises electronic data which corresponds to a full or partial visual image corresponding to the visual appearance of the scanned check or other item.

The example analysis module further includes a magnetic sensor including sensing elements 134. The magnetic sensing elements 134 are operative to sense the magnetic properties of documents which pass adjacent to the analysis module. In the example embodiment the magnetic sensing elements 134 include a plurality of discrete transversely spaced magnetic sensors. The magnetic sensors generally each cover a relatively small portion of the overall transport width. The sensors are arranged in sufficient proximity so that substantially the entire transverse width of the document path is sensed. The analysis module further includes a magnet 136. Magnet 136 may comprise a unitary or a plurality of permanent or temporary magnets. In the example embodiment permanent magnets are used. The permanent magnets operate to activate magnetic properties of magnetic inks on documents passing adjacent to the analysis module. These magnetic properties may then be more readily sensed by the magnetic sensing elements 134.

It should be understood that the particular sensors and devices in analysis module 62 are examples. Other embodiments may include only an optical scanner or magnetic sensing elements, or different or additional types of scanning and sensing elements. For example embodiments may include scanners for reading bar code or other types of optical indicia. Other embodiments may include devices for reading magnetic flux reversals that may be encoded in a magnetic media. Some embodiments may include read heads for reading MICR characters or other magnetically sensible features. Other embodiments may include devices which are operative to detect the presence of holograms or to read non-visible radiation, fluorescent inks, or other types of coding. The particular activating and sensing devices included in a particular analysis module will depend on the particular types of documents to be verified and analyzed through operation of the invention.

FIG. 3 shows schematically the relationship of the IDM 44 with example software components which operate in the terminal processor 32. The terminal processor 32 has operating therein an operating system layer schematically indicated 138. The operating system layer 138 may include operating systems such as OS/2® from IBM, Windows NT® or Windows XP® from Microsoft, Linux or other suitable operating system. The operating system communicates with a terminal control software layer 140. The terminal control layer in the example embodiment operates to control numerous aspects of the machine functions including aspects of the transaction function devices. As schematically represented in FIG. 3 the terminal control software sends messages to and receives messages from devices associated with the IDM 44. The messages are generally operative to control mechanical components of the IDM as well as to receive inputs from sensors and other devices which operate in connection with the deposit accepting function.

The example software architecture also includes a recognition subsystem software layer 142. The recognition subsystem software layer 142 also communicates with the operating system layer and the terminal control software layer to control and receive inputs from the IDM. The recognition subsystem software layer 142 includes software which functions to control, manipulate and analyze image data received from the IDM as schematically represented by image control component 144. Another software component of the example recognition subsystem software layer 142 accomplishes character recognition. This character recognition component schematically represented 146 in the example embodiment is operative to identify MICR coding and numerical characters. In the example embodiment the character recognition software includes software that is commercially available from Carreker Corp. Other providers of character recognition software include Parascript, Mitek and a2ia. Of course other suitable recognition software may be used. The recognition subsystem software layer 142 of the example embodiment also includes a magnetic data control component schematically represented 145 that is operative to analyze and to manipulate data received from the magnetic sensing elements and to check for correlation between the magnetic data that is sensed and the optical data which is obtained from the scanning activity. Of course these software functions are examples and these functions may be programmed differently and other or additional software components may be included in other embodiments.

Figure 7:
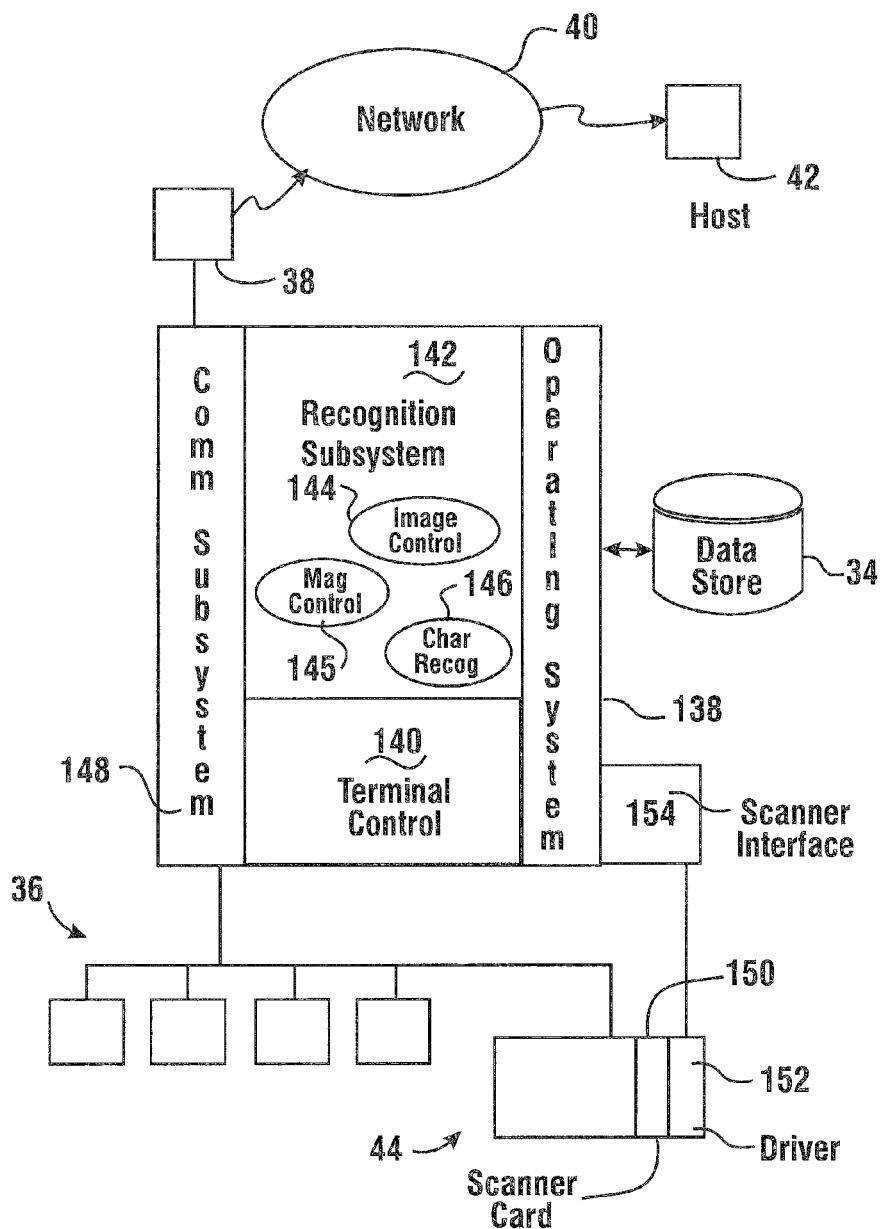
FIG. 7 is a schematic view of hardware and software components used in connection with the deposit accepting apparatus and the automated banking machine of the example embodiment.

FIG. 7 shows the example schematic components of the software in greater detail. As can be appreciated the operating system 138 in the terminal processor is in operative connection with one or more data stores 34. The data store may include the data corresponding to information concerning programs, transactions, instructions and other data or program logic which are necessary to control the operation of the automated banking machine. In addition the data store includes the data used in connection with analyzing and verifying documents. As later discussed the data store may also include image data corresponding to the images of documents that have been accepted by the system as well as transaction identifying data. The software in connection with the example terminal processor also includes a communication subsystem layer 148. The communication subsystem layer enables communication between the various software components of the system. The communication subsystem layer also communicates with the various transaction function devices 36 through appropriate interfaces or drivers. In addition communication layer 148 in the example embodiment also enables communication through appropriate interfaces 38 to one or more communications networks 40 and the host computers 42 which are operatively connected thereto. Of course this software architecture is merely an example and in other embodiments other approaches may be used.

In the example embodiment the IDM 44 includes an onboard computer processor which resides on a scanner card 150. The scanner card 150 further receives and operates upon data from the optical scanning sensors 132 on the analysis module 62. The scanner card further has included thereon a driver schematically indicated 152. The driver is operative to communicate through a scanner interface 154 with the operating system 138 and the data store 34. The driver 152 is also operative to control the scanning activity which is carried out by the scanner card 150. In the example embodiment the driver is also operative to control the allocation of memory for use in the scanner operation. This assures that adequate memory is available in RAM to carry out the capture, storage and analysis of the scanning data as required to analyze and authenticate documents which may be input in the machine.

Figure 8:
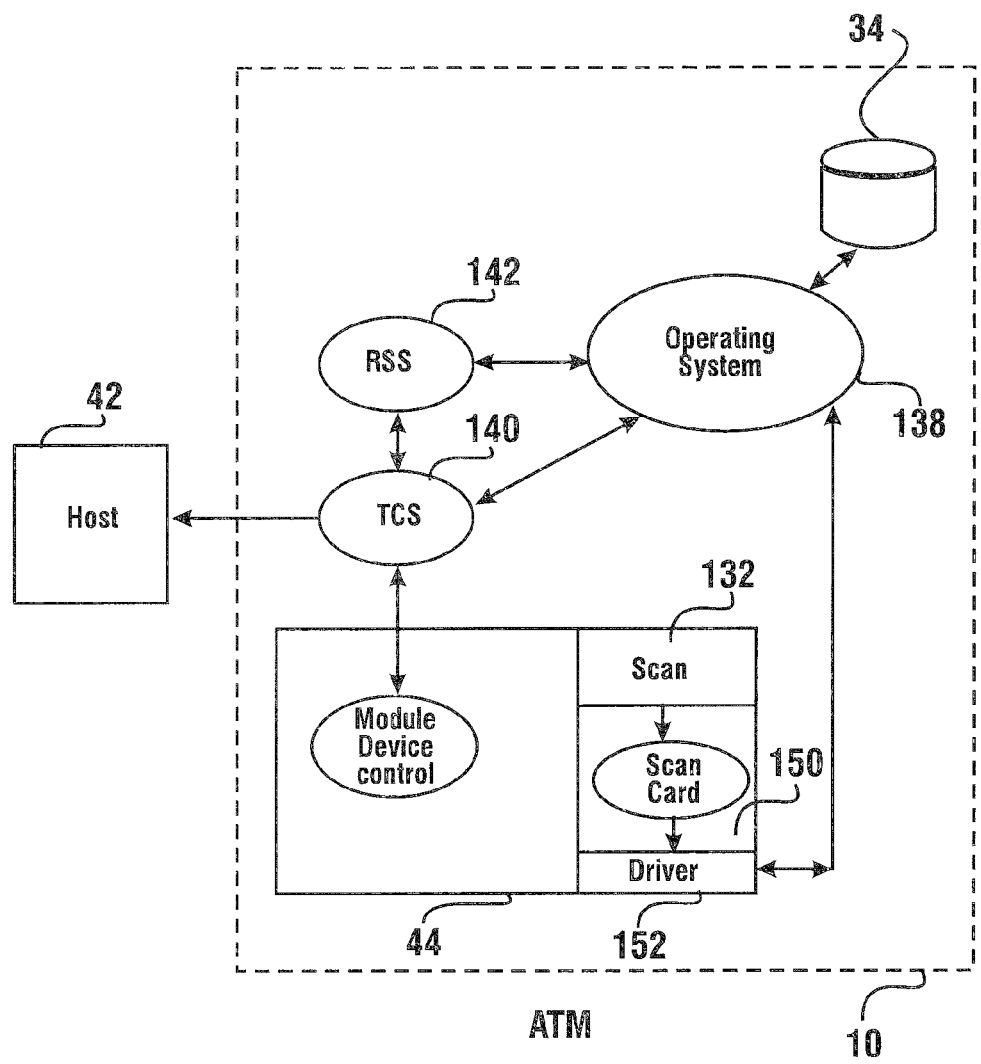
FIG. 8 is a schematic view of the interaction of components used in connection with accepting documents in the deposit accepting mechanism.

As represented in FIG. 8 in the example embodiment, when a document is to be scanned the terminal control software 140 causes the particular document to be moved as desired in the IDM 44. This is done by controlling the various devices which sense and move documents in and through the module. The terminal control software 140 operates in conjunction with the recognition subsystem software layer 142 which provide instructions to the scanner card 150 to scan documents using the optical scanning sensors 132 during the appropriate time periods. The data from the scanning process and magnetic sensing operations is returned through the operating system to memory. The data is then recovered from memory and manipulated responsive to the image control and character recognition features of the recognition subsystem software layer 142. The results of the manipulation and analysis of the scanned data is then communicated through the terminal control layer to a remote host 42. This is done in this example embodiment using transaction request and authorization messages of a type that can be handled within the framework of automated banking machine transaction processing systems. However it should be understood that in other embodiments of the invention other approaches to authenticating documents, verifying transactions and communicating with remote computers may be used.

The operation of the automated banking machine 10 will now be described with reference to an example transaction involving the deposit of a check or similar instrument. In this transaction the logic flow described in connection with FIGS. 9 through 13 is carried out.

In a first step shown in FIG. 9 the automated banking machine operates to receive identifying data from the user in the manner previously discussed. In a second step the user identifies the particular transaction type to be associated with the transaction. In this case the user may indicate that they are depositing a check or alternatively that they are cashing a check or other document. Because both types of transactions are related, they will be described in connection with the example logic flow as though the user had selected the option of cashing a particular check. It should be understood however that generally a user will be electing either to apply the amount of the deposited check to their account, or to cash the check.

At a third step in the transaction flow shown in FIG. 9 the user provides inputs corresponding to the amount associated with the transaction they wish to conduct. As optionally indicated in the fourth step, the institution operating the automated banking machine may charge a check cashing fee or similar fee for the convenience of cashing the check. If this is the case, an appropriate message will be output to the user through the display of the machine. The user may be requested to provide an input to indicate their acceptance of the transaction fee. If the user indicates that they do not wish to accept the fee or the user does not provide an input within a predetermined time period, the terminal processor may operate to close the transaction and return the machine to a ready state to conduct a transaction for another user. For purposes of this example it will be presumed that the user has indicated that they wish to proceed with the transaction.

In response to these inputs the terminal processor operates in accordance with its programming to open the gate 52 adjacent the opening to the transport section 46 of the IDM 44. The terminal processor also operates as indicated a sixth step to move the depository holding module 90 to a position in which an appropriate check holding compartment is in communication with the outlet 50 of the transport section.

The example embodiment includes at least one throat sensor adjacent to the analysis module 62. The terminal processor is operative in a ninth step to measure the document length. This is done for example based on the transport speed and the time that the document takes to pass the throat sensor. Because in the example embodiment it can be assumed that generally no slippage of the document occurs after it has firmly engaged the transport, the time that the document blocks the throat sensor generally provides a relatively accurate indication of document length. Of course in other embodiments equivalent mechanisms such as encoders on driving members or other devices may be used. The document length is calculated in the example embodiment by the terminal control software. It should be understood however that this technique is an example and in other embodiments of the invention other approaches may be used.

During the step of measuring the document, the document is moved past the analysis module 62 to a position intermediate of the analysis module and the deposit holding module. The document at this point is in a "ready to scan" position. The terminal processor next operates in accordance with the eleventh step in FIG. 9 to move the document past optical and magnetic sensors in the analysis module 62. As the document moves past the analysis module, the terminal control software and recognition subsystem software layer 142 gather the image and profile data that is used to analyze and/or produce an electronic image of the document. As the check passes the magnet 136 the magnetic ink thereon is magnetized. This magnetized ink is then sensed by the magnetic sensors 134 which provide a profile of the area in which magnetic ink is present. For example in the example embodiment, the check includes a line of MICR coding. This line of MICR coding (alternatively referred to herein as the MICR line) causes signals to be produced by the magnetic sensing elements 134 as the characters pass such sensors. The document may be skewed relative to the transport section through which it passes. However regardless of whether the document is straight or skewed it will produce a magnetic profile.

A magnetic profile associated with the document may be indicative that the document is genuine. This is because photocopies or other simulated checks generally would not include magnetic coding. Thus the sensing of any magnetic coding on the document by the analysis module suggests that the document that has been inserted is a genuine printed check. However as later discussed alternative embodiments may include approaches for reducing the risk that the check is a forgery that has been produced using magnetic inks.

Movement of the document past the optical scanning sensors 132 causes image data to be produced which is indicative of the optical characteristics of the document passing in the transport section. This image data corresponds to an electronic image of the check that is captured through operation of the scanner card and included in the data store associated with the machine. The scanning process is continued as the check moves past the analysis module 62 as shown in FIG. 4.

As indicated by the twelfth step in the logic flow in FIG. 9 the terminal processor next operates to apply the rules which are associated with the programs stored in memory concerning the particular type of document associated with the transaction. Generally at least one input by the customer indicating that they are making a check deposit may be correlated with certain stored data or rules which indicate the particular characteristics of the document that is to be received. In some cases the inputs may correspond to a particular sized document. Alternatively the rules may correspond to particular configurations or other characteristics. In this example the rules stored in memory are also indicative of "windows" or particular zones or areas in the document landscape in which data which should be analyzed on the document may be found.

In accordance with the example embodiment which operates to analyze check, the terminal processor operates in accordance with the applicable rules recovered from memory as associated with a check deposit to deskew the data corresponding to the image and place it in registration with an imposed coordinate system. This is done in the example embodiment through use of a programmed series of steps which finds the boundaries of the image data. This is done by comparing the pixels which make up the image and generating at least two of the lines which bound the document. By identifying these lines, one or more corners of the document may be identified. The terminal processor in the example embodiment then through a series of programming steps next operates rotate and shift squared up image data to the reference point of a coordinate system. This shifting places the leading corner at the origin of the imposed x and y coordinate system. The leading corner is placed along the "y" axis while the trailing corner is placed along the x axis. It should be understood that all of the pixels which make up the image are correspondingly adjusted.

As represented by the fourteenth step shown in FIG. 10 the terminal processor next operates in accordance with its programming to apply template logic to the shifted image. The computer operates to recover from memory, data corresponding to at least one selected template. In example embodiments a plurality of templates may be stored in memory and the selected one is recovered responsive to customer inputs to the machine, indicia read from the document or other data. In this step the computer operates to apply a template over the shifted image to identify for analysis "windows" within the image that contain data that is of interest. It should be understood that these windows are examples and in other embodiments other or additional windows may be included. Such windows may include, for example, a window for the so called legal amount which is the written or typed amount of the check. A window may also be provided for an "amount not to exceed" indicator, date, payee name, payor name or other information that appears on the check. It should further be understood that these processes for identifying windowed zones or areas within shifted data are carried out through operation of the at least one processor and the computer executable instructions included in the recognition subsystem software layer 142, and that these example representations merely serve to explain the nature of an example form of the analysis that is carried out.

As represented in a fifteenth step shown in FIG. 10 the computer operates to analyze the data in the window of the template which corresponds to the potential location of the MICR line. This is accomplished by the image control component 144 of the software analyzing data from the data store. It should be understood that the data within the particular window may or may not correspond to the MICR line depending on the orientation of the document as well as whether the document itself is valid.

The computer then operates in accordance with a sixteenth step represented in FIG. 10 to pass the data extracted from the window. This character recognition software component is operative to apply the logic used for optically reading MICR symbols. In the example embodiment this is a logic associated with reading e-13B type characters. The character recognition software component 146 is operative to analyze the data and make evaluations in looking for known characters of the particular type. In the example embodiment the characters represented which are resolved are processed to derive ASCII values corresponding to the characters.

In a next step as represented in FIG. 10, recognition subsystem software layer 142 is operative to check the returned data for the presence of particular characters, in this case routing and transfer characters. Generally valid MICR line data will include such characters and the detected presence thereof in the data analysis is an indicator that the MICR line data has been properly found and read.

At a nineteenth step shown in FIG. 10 the recognition subsystem software layer 142 operates to determine if the degree of assurance or confidence as indicated by the character recognition component for the values returned, is above a threshold. The determination of the level of assurance is based on one or more values delivered by the pattern recognition algorithms in the character recognition software component used in the example embodiment. In the example embodiment the threshold is generally set at about a 70 percent assurance level. As indicated in FIG. 10 the computer operates in response to its programming to proceed based on whether the level of assurance is at or above, or below the threshold. Of course this approach is an example and in other embodiments other approaches may be used.

As indicated in FIG. 10 if the level of assurance in the determined MICR values is indicated as below the threshold and/or if routing and transfer characters are not found, the recognition subsystem software layer 142 through operation of the image control software component, operates to further manipulate the image. In the example transaction the computer operates to manipulate the data to essentially transpose and flip the image 180 degrees and to again read the data in the MICR line window. It should be understood that in other embodiments the data corresponding to the image may be manipulated in other ways in order to attempt to translate the image so as to find appropriate data.

As indicated in the twenty-first step in FIG. 10 the translated image data now in the window is again read and passed to the character recognition software component 146. This again causes the output of ASCII values based on the characters in the window. As indicated in the twenty-fourth step these values are then checked for the presence of routing and transfer values. As indicated in step twenty-five in FIG. 10, if the MICR values read have an associated level of assurance at or above the threshold and routing and transfer characters are present the recognition subsystem software layer 142 is operative to proceed with further analysis of the image. However if the level of assurance remains below the threshold and/or there are no routing or transfer characters, this may be an indication that the document is not valid. In some embodiments the automated banking machine may operate to further transpose the data and conduct additional analysis. This may be particularly appropriate in situations where both sides of the document are being scanned and the document may be in different orientations. In this case the terminal processor causes the machine to operate to return the document to the customer and to close the transaction.

As represented in the logic flow which continues in FIG. 11, if the characters in the MICR window are read with a level of assurance that is at or above the threshold and the routing and transfer characters are present, the terminal processor next operates to cause the courtesy amount data in the window to be read. In the example embodiment the recognition subsystem software layer 142 operates in response to landmark rules associated with the document type in memory to assist the analysis in finding the courtesy amount within the window. These techniques may include for example in the reading of a check, looking for the box or line on which the courtesy amount is written. In this case the value is a monetary amount. The amount may be printed or cursive characters. It may also look for known characters such as the dollar sign, the fraction sign, decimal point or star characters which are commonly included in printed checks to indicate places before the dollar amount. Of course it should be understood that the particular templates and landmark rules used will depend on the programming of the machine and the type of document involved. The machine may have access to stored data corresponding to a plurality of templates and/or rules, and may apply them to documents based on data derived from customer inputs, the document, memory data or combinations thereof.

As represented in a twenty-eighth step in FIG. 11 the terminal processor further operates responsive to the recognition subsystem software layer 142 to binarize the data in the courtesy amount window which essentially can be thought of as reducing the sensed data to black and white. This further assists in identifying the characters. The character recognition component 146 then applies its logic in looking for U.S. dollar type numerical characters within the data, and as represented in a twenty-ninth step in FIG. 11, the recognition subsystem software layer 142 outputs an ASCII value indicative of the courtesy amount. In some embodiments the level of assurance associated with the courtesy amount is also analyzed to determine if it is above a threshold to verify that the amount has been accurately read. Alternatively, or in addition, the derived courtesy amount may be compared to the data input by the customer concerning the amount of the check. In alternative embodiments the character recognition subsystem software layer 142 may operate to read the characters in the legal amount field and compare the legal amount to the courtesy amount. Alternatively or in addition, in some embodiments the MICR line may include indicia representative of the amount of the check or an amount which the check is not permitted to exceed. In such cases the encoded MICR data or the values to which it corresponds may be compared to the courtesy and/or legal amounts. Further in some embodiments the check may include a field that indicates a value which a check is not to exceed. This value may be read and compared through operation of one or more computers to the amount data found in the courtesy amount, legal amount, or MICR line. Such comparisons may enable the machine to identify situations where the amount data is not consistent, which is indicative of an inability to properly read that check, and/or an unauthorized modification of the check data. If there is a discrepancy and/or the level of assurance is below the threshold the check may be returned and the transaction closed.

The example recognition subsystem software layer 142 further operates in accordance with the thirtieth step represented in FIG. 11 to check for the presence of magnetic ink on the document in the proper location. This is done in the example embodiments by component 145 determining the length and configuration of the magnetic profile associated with the document. This length and orientation data may be normalized in the manner of the image data based on the imposed coordinate system, and compared therewith to verify that the magnetic areas correspond to the optical data corresponding characters in the MICR line. In addition certain documents may also include magnetic characters in other areas of the document. These other characters which may not necessarily be included within the optically analyzed data, may be further checked to provide an indication of the genuineness of the document. Of course in alternative embodiments as previously discussed, the mere presence of magnetic ink on the document may serve as a sufficient indication that the document is genuine.

In some alternative embodiments at least one computer in the automated banking machine may be operative to further verify the genuineness of a check presented to the machine by looking for evidence of magnetic indicia within the image data corresponding to the check in appropriate places or locations which suggest that the check may have been produced fraudulently. In such embodiments the computer may be operative to look for evidence of magnetic ink within preprinted fields of one or more templates which would normally not include magnetic indicia. The presence of magnetic indicia in one or more of these fields may be indicative that the check may have been printed by a forger with a printer that prints in magnetic ink. This may be indicated, for example, by the data in a maker field, date field, maker signature line or other areas being presented in magnetic ink when no magnetic ink would normally be found in such areas. In some embodiments, for example, the recognition subsystem software layer 142 or other computer in connection with the machine may be operative to first locate the MICR line within the image data in the manner previously discussed. Thereafter, the system may operate to disregard the magnetic indicia in the MICR line and analyze other magnetic indicia and/or its location relative to the image data. Based on programmed parameters such as, for example, finding magnetic indicia in other printing on the check may cause the machine to identify the check as a potential forgery. In such circumstances the check will not be cashed by the machine. The check may be returned to the user or alternatively retained in the machine as a precaution to prevent the check being passed in another location. Of course these approaches are example and in other embodiments other approaches may be used.

As indicated in the thirtieth step of the example embodiment represented in FIG. 11, if the magnetic data sensed does not properly correspond to the document the terminal processor operates to identify the document as suspect. The example terminal processor then operates to return the document to the customer and to close the transaction. However, if the document has an appropriate magnetic profile the terminal processor next moves to a thirty-first step.

In the thirty-first step the terminal processor operates to configure and send an authorization message through the network to the host. This authorization message will generally include the data appropriately necessary in an automated banking machine transaction message for purposes of authorizing the transaction. Such data may include customer identifying data such as a user's name and/or primary account number ("PAN") and PIN related data, the transaction type and the amount input. In addition the transaction data may include data derived from the document, such as data representative of the data corresponding to the characters in the MICR line as well as the courtesy amount read from the check as determined by the recognition subsystem software layer 142.

It should be appreciated that providing the data read from the check in numerical or other compatible format as part of an authorization message is useful for facilitating processing of the data in some systems compared to transmitting an entire image of a check to a host computer for analysis and authorization. In example embodiments the check data may be included in a field in a Diebold 91x type transaction message or in a selected field in an ISO 8583 message. A host computer may readily determine the data included in such messages and analyze it for purposes of deciding whether or not to authorize the transaction.

In this example transaction when the host receives the request message from the automated banking machine, it operates to determine if the customer data corresponds to an authorized user as well as whether the user is authorized to conduct the transaction requested. The operator of the host computer may also be enabled to apply certain rules, including preventing particular users from cashing checks or limiting the amount of the deposited check which can be cashed. Various types of rules may be selectively applied depending on the particular user and the amount of the check. In addition the host computer may also analyze the account data on the check. This may include for example communicating with other systems or data stores to determine if the account upon which the check is drawn is valid and/or holds sufficient funds as represented by the courtesy amount on the check. The computer may also compare certain data such as the courtesy amount read, to data input by the customer concerning the value of the check. The computer may also compare data corresponding to the legal amount read from the check to the courtesy or amount or other monetary amount data based on the MICR line or a maximum amount printed on the check. The computer may also analyze aspects of the data such as the institution or the location thereof, upon which the check is drawn for purposes of applying its programmed business rules and logic and in deciding whether to allow the user to deposit or cash the check. Of course in some embodiments business rules may be applied by the one or more computers operating in the automated banking machine as well as through the operation of one or more remote host computers.

In accordance with its rules and logic the host in the example embodiment returns a response message to the automated banking machine. This is represented by a step 32. For purposes of this example it will be presumed that the user is authorized to deposit or cash the check. Of course if the check is not authorized to be deposited or cashed the response message includes data indicative thereof. The machine will operate under control of the terminal processor in response to data indicative that the transaction is not authorized to return the check to the user and to close the transaction. Alternatively, if the check appears to be fraudulent, the machine may capture and store the check.

As indicated by the thirty-third step in the example embodiment the machine operates in accordance with its programming to display a graphic image of the check deposited on its display 22. The terminal processor also operates in a thirty-fourth step in the sequence to store a copy of the image file in a data store at the machine. In some embodiments this image file may be later recovered for purposes of tracking and documentation. Such image files may be compressed for purposes of saving storage space. In one example embodiment the graphic image of the check is stored in memory as a PCX file. Of course other file formats may be used. In other embodiments the image file may also be accessed from or downloaded to remote computers connected to the system. As previously discussed, such remote computers may be operative to process the check and to carry out settlement related thereto, using the electronic image document as a substitute for the paper check.

The computer next operates in accordance with a thirty-fifth step to print a receipt for the customer. In the example embodiment because a graphic image of the check is available within the automated banking machine, a graphic representation of the check may be included on the receipt provided to the customer. In addition the terminal may operate to print a similar graphic image on a journal printer or in other hard storage within the machine. Alternatively or in addition, in machines including a camera or other image capture device, an image of the user may be stored and/or printed in correlated relation with the check data, including on the receipt, on the check and/or on a journal.

After printing the receipt the automated banking machine next operates under control of the terminal processor to cancel and store the check. The computer causes the transport section to again move check towards the deposit holding module. In addition the terminal processor operates to align the appropriate document compartment so that its opening is in communication with the outlet of the transport section.

As indicated in a thirty-seventh step the check is moved until it is sensed adjacent to the printer mechanism 114. Upon sensing the check adjacent to the printer the terminal processor operates to print cancellation data on the check. This cancellation data is printed on the check as it moves in the transport. This may include for example information about the user and/or the transaction, including images. As indicated in a thirty-ninth step in the sequence, the transport continues to move the check until it is sensed as having passed into the storage compartment. Such activity may be sensed through sensors similar to those previously discussed positioned adjacent to the outlet 50 of the transport.

After moving the check into the document storage compartment the terminal processor operates the translation mechanism 94 associated with the deposit holding module to tamp the documents in storage. This is accomplished as indicated by the fortieth step by moving the tamping member 96 downward. This serves to assure that the documents in storage are compacted to the extent possible and assures that a larger number of documents may be accepted before the need for removal of documents from the storage compartment.

In some embodiments, the terminal may operate in accordance with its programmed instructions to provide the user with an output asking if they have further checks to deposit. The user may respond with at least one input, and if so a portion of the transaction sequence can be repeated beginning with step 2 in the transaction sequence for example, to accept another check or other document. In such situations the value of the further check or other document may be added to the value of the prior items. In some embodiments items which are deposited may have different properties. For example, in some embodiments the machine may accept items that do not include magnetic coding. Such items may include other features such as verification codes, symbols or characters that are a function of other values or indicia on the items. Such items may include for example vouchers issued by the machine for a difference between an amount the user was entitled to receive and the value of cash dispensed that could not be dispensed in prior transactions. The machine in such embodiments is operative responsive to its programming to adjust the verification sequence to suit the particular document type being received. The particular document type being received may be based on the at least one input to the machine in the second step, indicia read from the document type, and/or other inputs or data.

In embodiments where a plurality of types of documents are accepted, the machine may operate in accordance with its programming to conduct an analysis of the indicia on the document that is appropriate to verify the particular document type. The document storage module may also include compartments for each type of item that is to be accepted. In this way different item types may be segregated to facilitate removal and sorting.

In some embodiments the receipt of successive documents from one user may continue for a plurality of checks, vouchers or other type items. If the items are verifiable as genuine by the machine and redeemable for cash or credit, the machine may operate to aggregate the value of all such items. The transaction sequence may continue to repeat based on instructions and inputs to the machine in the transaction sequence. It should be understood that for purposes of the example transaction sequence there has been only one item deposited, and only one example type analysis of a document which is a check has been described.

As indicated in the forty-first step if the customer has requested a deposit only transaction during the transaction selection step, the terminal processor causes the machine to go to the forty-fifth step in the transaction sequence. However if the customer has requested to dispense cash based on the value of a cashed check, the logic moves to the forty-second step. If the dispense transaction has been authorized, the terminal processor operates the cash dispenser to dispense an amount of cash. In some embodiments the amount of cash which may be dispensed may correspond exactly to the amount of the check (less transaction fees in some cases) that has been presented by the customer. This may be done for example in an automated banking machine which includes a cash dispenser with coin dispensing capability. However in many embodiments the machine may be capable of dispensing only certain denominations of currency. This may preclude the customer from receiving the exact amount of change to which they are entitled.

Alternatively the computer may operate to print and provide a check or other type negotiable instrument to the user. This negotiable instrument may be cashed like a check at the machine or at another location by the user. Such an instrument may be input by the customer to the machine in a subsequent transaction. For example the machine may operate in the subsequent transaction as previously discussed to accept several checks including the negotiable instrument previously dispensed. The user may elect to cash the amount of these checks or have them credited to an account.

The machine may include among its transaction function devices check or voucher printer devices. These printer devices may be supplied with a stock of check media with magnetic coding that may be similar to other types of checks. The coding may correspond to the account of the operator of the machine or other entity whose account is to be charged for the amount of change received by a machine user. In such embodiments the check is completed by a printing device with the amount of change for which the check may be redeemed. The check may be printed by the machine with the user's name as payee based on the transaction data received, or alternatively made out to cash. Images of the user may be printed on the check for authorization purposes as previously discussed.

The check once completed with the appropriate data and/or images may be dispensed from the machine to the user. The user may cash the check at the machine on the current session or in a subsequent transaction session, or at another location that accepts checks. In some embodiments the check stock provided in the machine may prominently display a statement of maximum value above which a check would not be valid. This may be for example, the smallest denomination currency bill dispensed by the machine. For example if the lowest denomination bill that the machine dispenses is a one dollar bill, the value of change would always be generally less than one dollar, and the statement of maximum value of one dollar which would conspicuously indicate to anyone redeeming the check that if it is above this amount it has been tampered with. Of course the maximum amount may vary depending on the machine and its capabilities. Also having such limited value checks in the machine reduces the risk to the machine operator in the event the machine is broken into and the check stock is otherwise stolen. Alternatively the maximum value statement on the check may in some embodiments be printed by the machine itself.

Checks issued by the machine on check stock may include MICR coding. Such checks may be verified by the machine in the same manner as other checks. Alternatively the machine may include a transaction function device which provides vouchers, scrip or coupon material that is redeemable for cash, credit, services and/or merchandise. In some embodiments such items, which will be referred to as a voucher for purposes of brevity, may have unique indicia or characteristics that are indicative of authenticity. Such indicia or characteristics may include indicia readable by the machine. Such indicia may include a unique magnetic or visual characters and/or profile which is indicative that the voucher is genuine. Of course, such vouchers may in other embodiments include visible or non-visible indicia including images of the user, which are capable of being read and used to verify the authenticity of the voucher. As previously discussed, when such an item is presented to the machine to be redeemed, the machine adjusts the verification steps in accordance with its programming as appropriate for the particular type of document. This may be based on user inputs, information read from the document, or other data.

As indicated at the forty-fourth step in the sequence the terminal processor operates to cause a receipt to be printed for the user indicating the amount of the cash dispensed. This receipt may also include other information including the amount of change that the user received and an indication of how the value associated with this change was either applied or provided to the user. Of course as previously discussed, in this printing step the terminal processor may also operate to print vouchers, coupons, negotiable instruments or other items that the user has requested to receive.

As indicated at the forty-fifth step the terminal processor next operates in accordance with its programming to prompt the user on whether they wish to conduct another transaction. For purposes of this example it will be assumed that the user declines another transaction. The terminal processor next operates the machine to close the transaction. This may include for example returning the card to the customer, outputting "thank you" messages or other appropriate steps associated with completing the transaction and/or readying the machine for a next customer.

In the forty-seventh step the terminal processor operates to send a completion message to the host. As previously discussed the completion message generally includes data indicative of whether the transaction was successfully carried out. In addition in some embodiments, the completion message may also include data representative of any change that was due to customer and how the customer chose to apply or receive the amount of change. The confirmation data included in the return message may also include data representative of the issuance of an item and/or the identity of the merchant or other entity to whom a credit is required to be issued in consideration of vouchers or coupons that were dispensed to the customer. The completion data may also include a transaction number or data that can be used to identify or authenticate a check or voucher issued to a user. Likewise the message may include data representative of loans, accounts or charities to whom the customer may have elected to apply their change balance. Other appropriate data indicative of the completion of the transaction may be included. The host computer operates in response to this message to appropriately close the transaction and to apply the funds accordingly and to store data in one or more data stores in operative connection with the host.

As can be appreciated from the foregoing description, the example form of the deposit accepting apparatus and system and its methods of operation, may provide substantial advantages over prior art systems and methods. The example system reduces the need to manipulate documents. This results in increased reliability by reducing the risk of document jams or other malfunctions. The example embodiment further reduces the need to achieve alignment of the document for purposes of reading or analyzing the data thereon. Generally as long as the particular document is presented in an appropriate transport direction the data may be analyzed and manipulated so as to achieve authorization of the document. It should be understood that while the example embodiment shown analyzes indicia on only one side of a document, other embodiments may analyze indicia on both sides of documents. This may be accomplished for example by having analysis modules on both sides of the document path. Such arrangements in some embodiments may enable documents to be reliably read and analyzed regardless of orientation.

It should be understood that while the example embodiment has been described as reading checks and vouchers, other embodiments may be used for reading other document types. Such other document types may include for example statements of charges such as deposit slips, utility bills, credit card bills and other statements of charges. Embodiments may further be adapted to read other or additional types of coding such as one or two-dimensional bar codes, other character sets, alphabets of various languages or other characters. Embodiments of the invention may accept only one type of item, or a plurality of types of items. Further, while the example embodiment accepts envelopes, other embodiments may not accept such items, or may accept other types of items.

It should be understood that the architecture of the computers and software described is example. Other embodiments may use different computer and/or software architectures to accomplish the functions and methods described. Further the one or more computers operating in an automated banking machine may be programmed by reading through operation of one or more appropriate reading devices, machine readable articles which comprise media with computer executable instructions that are operative to cause the one or more computers (alternatively referred to herein as processors or controllers) in the machine to carry out one or more of the functions and method steps described. Such machine readable media may include for example one or more CDs, DVDs, magnetic discs, tapes, hard disk drives, PROMS, memory cards or other suitable types of media.

Some example embodiments further facilitate transaction processing by being able to verify and analyze document images within the automated banking machine. This may avoid the need to transmit entire document images to a remote location for purposes of analysis. Further an example embodiment enables the application of processing rules which facilitates analyzing required data and moving forward with transactions only when such data is read with a sufficient level of assurance that the data has been read accurately.

A further advantage of the described example embodiment is the ability of a single mechanism to reliably handle both sheet type materials and envelopes. This avoids the need to include multiple depositories within a machine. In addition the embodiment also produces data representative of graphic images of items that have been placed into the depository. Images may be analyzed at the machine or forwarded to another device for verification purposes. Embodiments may be used to conduct payor and/or payee signature analysis including analysis for the presence of signatures and/or for the genuineness of cursive signatures.

Another advantage of the example embodiment is that items placed in the deposit accepting apparatus may be read through imaging or other methods and then returned to the customer. These may include items such as drivers' licenses, identification cards, passports or other articles that generally will not be retained within the machine. The example deposit accepting apparatus also has the capability of receiving documents, reading and/or capturing images and printing on them for purposes of authentication or cancellation and then returning them to the customer. This may prove advantageous for example in the case of customer bills or payments where the customer is provided with a marking on the particular bill to indicate that payment has been made. In addition the example embodiment may handle numerous different types of items and documents in this manner. For example embodiments may be used in applications such as issuing items such as drivers' licenses, license plate stickers, gaming materials, and other items. Embodiments may be used for redeeming items and issuing new or replacement items. Further advantages will be apparent, and those having skill in the relevant art may apply the principles of the claimed invention to numerous embodiments.

Figure 13:
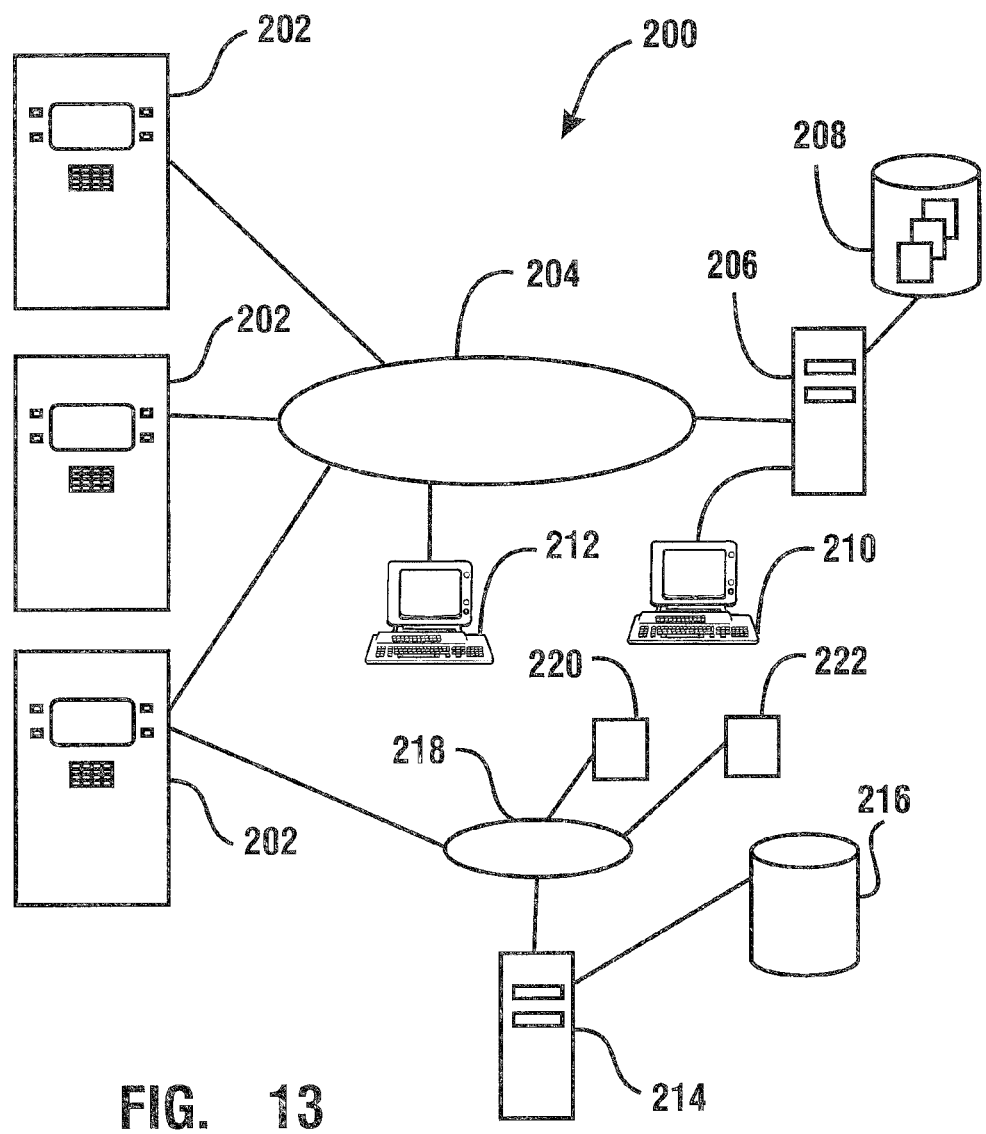
FIG. 13 is a schematic view of an alternative system of an example embodiment including check accepting automated banking machines.

FIG. 13 shows an alternative example embodiment of a system generally indicated 200, in which check cashing is provided through automated banking machines. The system includes automated banking machines 202 which may be automated teller machines of the type previously discussed. Machines 202 are connected through a network 204, to a host computer which is alternatively referred to as a transaction server generally indicated 206. Network 204 may comprise any of a number of public or private networks suitable for communicating between host computer 206 and the machines. As schematically represented in FIG. 13, host computer 206 is in operative connection with at least one data store 208 which includes various types of instructions and stored data. Host 206 is also in operative connection with a host interface terminal 210. As can be appreciated, data stores are also referred to herein as computer memories.

In the example embodiment system 200 includes at least one administrator station 212. Administrator station 212 in the example embodiment is a computer or server in operative connection with the network 204. Administrator station 212 is used by the operator of the automated banking machines 202 for purposes of configuring the system and monitoring transactions which occur at the machines 202.

Example system 200 further includes a check image server 214. As shown schematically, the check image server 214 is in operative connection with a data store 216. Check image server 214 is connected to automated banking machines 202 through a network 218. Network 218 may be the same or different network than network 204. Other servers 220 and 222 are connected to the network 218. In the example embodiment check image server 214 is operative to receive data corresponding to electronic images of checks that are received at the machines 202. The check image server 214 may be used to archive data corresponding to such images and to accomplish settlement among the various entities which hold accounts which must be credited and debited in the conduct of a check cashing transaction.

In the example embodiment of system 200, automated banking machines 202 are specifically operated for purposes of providing check cashing services. Such check cashing services may be provided for persons holding accounts with the operator of the system such as a financial institution. Alternatively in some embodiments machines 202 may be specifically operated to provide check cashing services for persons who do not hold accounts with the operator of the system but who have a need to cash checks drawn by makers who have accounts or other relationships with the operator of the system. This may be, for example, a situation where a particular entity has contracted with the operator of the system to honor checks for which the entity is a maker and which are deposited in a machine. Alternatively, other embodiments may be operative to cash checks for which the particular maker of the check has an account relationship with the operator of the system. As later discussed, in some example embodiments checks may be cashed at the machines 202 by users who are associated with the makers of checks and who are correlated with data corresponding to such makers in one or more data stores operatively connected to the system. Of course these approaches are example and in other embodiments other approaches may be used.

In addition, in example embodiments the automated banking machines 202 may be operative to image checks or other documents and to store data representative thereof and/or to provide the image data at a point proximate in time or at a later time to a remote computer such as check image server 214 shown in FIG. 13. In addition, the machine may be operative to conduct printing on the check or to otherwise cancel and/or store the check.

Figure 14:
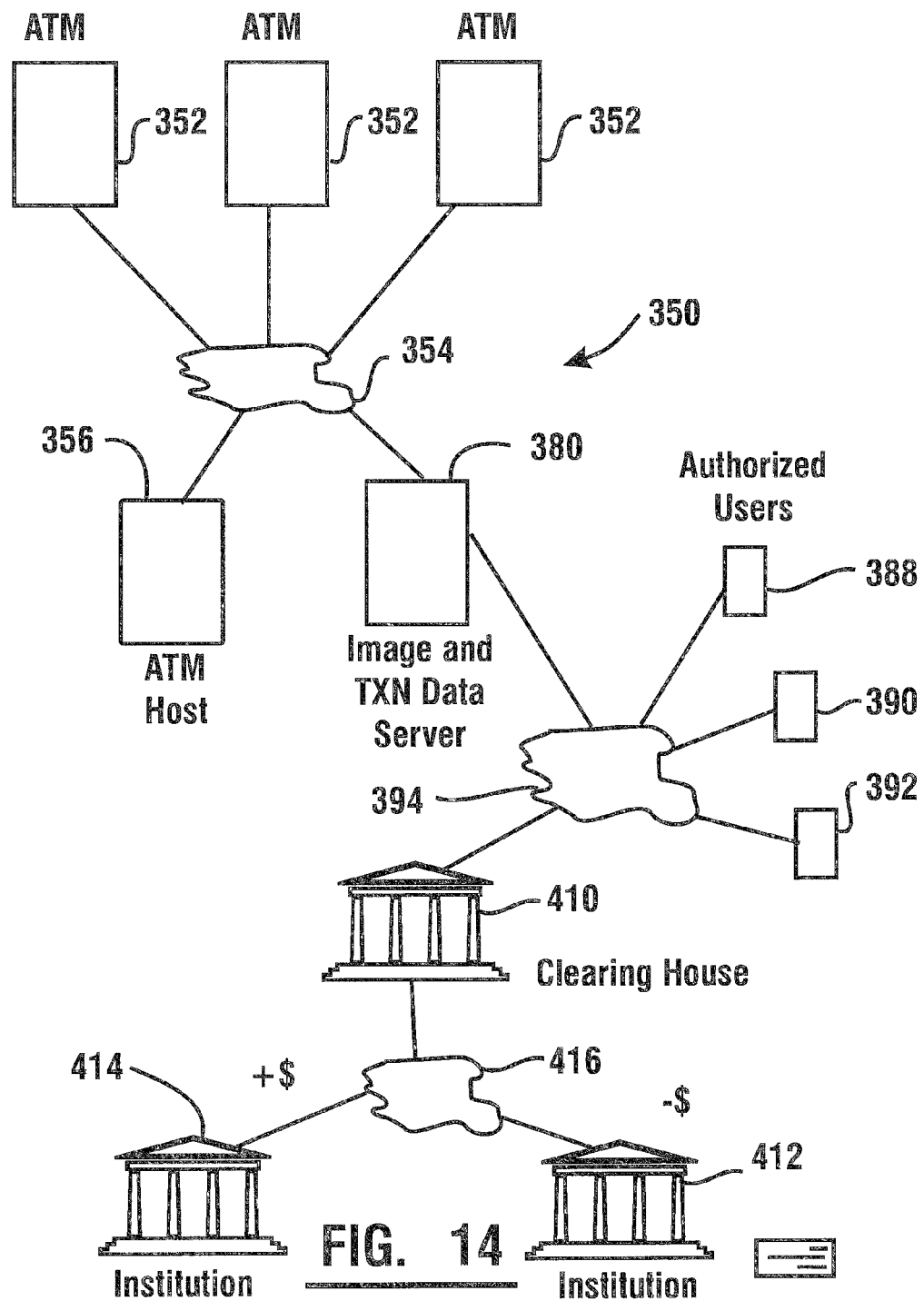
FIG. 14 is a schematic view of an alternative system for processing check transaction data and image data related to checks received through automated banking machines.

An alternative embodiment of a system for cashing checks through automated banking machines and delivering images of such checks for further processing is represented by a system generally indicated 350 in FIG. 14. System 350 includes a plurality of automated banking machines 352 which communicate through one or more networks 354 with one or more remote computers represented as a machine host 356. Machines host 356 communicates with the machines to conduct transactions generally in the manner previously described. In the example embodiment the machine transaction host can communicate with the machines 352 for purposes of carrying out a plurality of transactions. These may include cash dispensing transactions that do not involve receipt of a check, deposit accepting transactions which involve receipt of deposit items such as checks, balance inquiries, account transfers and/or other or different transactions depending on the automated banking machine type used and the programming by the operator of the system.

The example system 350 differs from the systems previously described in that image data corresponding to electronic images of both the front and the back of each check presented at the machine is delivered remotely from the machine for purposes of further processing. Further processing is facilitated in the example embodiment by the automated banking machine providing image data with transaction identifying data which can be used to facilitate the further processing of the transaction. In the example embodiment the transaction identifying data is provided by the machine host in the message that the host sends to the machine authorizing the acceptance of the check. This transaction identifying data may include the information that is needed for further processing of a settlement of the check. In some embodiments this enables the image messages which are delivered by the machine, to be used to process the check electronically as a substitute for the paper document. This may also avoid the need to recover some additional transaction data from other sources or systems because such data has been associated by the machine with the image as part of the image message. Of course this approach is example and in other embodiments other approaches may be used.

Figure 15:
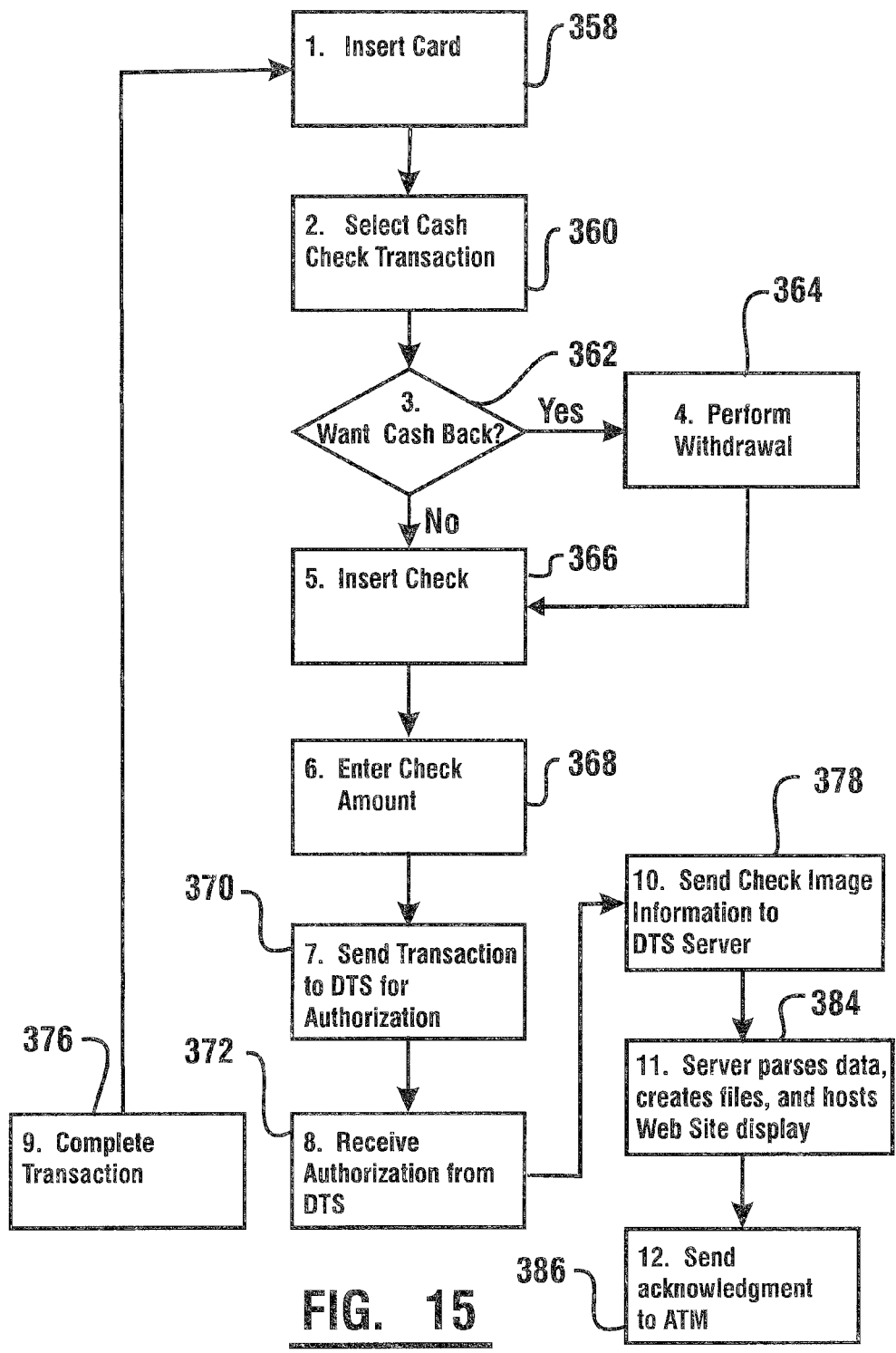
FIG. 15 is a schematic view of the logic flow associated with a check accepting transaction conducted at an example automated banking machine used in connection with the system represented in FIG. 14.

In the example embodiment a check cashing transaction or other transaction including presentation of a check conducted at one of the machines 352 proceeds in accordance with the logic schematically represented in FIG. 15. The transaction logic as represented begins at a step 358 in which a user inserts their card. This may include for example a debit card of the user which includes the user's name, primary account number or other identifying information. In addition it should be understood that although in the schematic representation the user is not indicated as being required to input a PIN or other identifying data such as a biometric input, the input of such data may be required in some embodiments.

After the user has input identifying information to input devices of the user interface of the automated banking machine at which a transaction is being conducted, the logic proceeds to a step 360 in which the user selects a check acceptance transaction. This is generally done in response to outputs through one or more output devices of the machine such as the display screen. In the example embodiment the option for having checks accepted in the machine is one of several transaction options available to users of the machine.

After the user has selected a check transaction in step 360 the logic flow proceeds to a step 362. In this step the example machine is operative to prompt the user as to whether they wish to receive cash in exchange for the input check or whether they wish to have the value of the check credited to their account. From this step 362 if the user provides one or more inputs to indicate that they wish to receive cash in exchange for the check, the machine executes a step represented in 364 and the terminal processor operates to include in the message an indication that the user is not only seeking to deposit a check but also to make a withdrawal as part of the transaction. In step 364 the terminal processor of the example embodiment is also operative to arrange for the inclusion of appropriate data in messages that are eventually sent to the automated banking machine host so as to indicate the customer's selections.

Once the customer has indicated that they wish to receive cash in exchange for the check or a customer declines to receive such cash and indicates they wish to deposit the amount of the check in their account, the logic next proceeds to a step 366. In step 366 the customer inserts the check into the machine and the check is processed by the IDM in the example embodiment. The check is also imaged by the check imaging device included in the IDM so as to generate image data corresponding to the visual appearance of the check.

In the example embodiment electronic images representing both the front and the rear of the check are produced. In addition in the example embodiment in step 366 the terminal processor is operative to analyze the image data by reading the indicia on the check. This includes analyzing the indicia which corresponds to the MICR line and producing the data which corresponds thereto which can be included in an automated banking machine transaction request message. Further in the example embodiment in step 366 the terminal processor is operative to determine an amount associated with the check which can be done in the manner previously discussed such as by using character recognition software to determine the amount of the check based on the courtesy amount, the legal amount or other amounts on the check. Embodiments may also analyze image data for other information to evaluate whether the check is a valid check. This may include checking for a payee name, a payor endorsement, a payee endorsement, a bank name or other data. In some embodiments the quality of the image data may be analyzed for features such as contrast, line boundaries, overlap of indicia or other features which indicate that the image data will not produce a suitable legible image. Of course these approaches are example and in other embodiments other approaches may be used.

In the example embodiment after the check has been inserted in step 366 the terminal processor is operative to prompt the user to input the amount of the check in a step 368. This may serve to assure that the character recognition software has analyzed the amount of the check correctly. As previously discussed, in some embodiments an image of the face of the check may be displayed to the user through an output device on the automated banking machine at the time the request is input so that the user can review the amount as they are providing the input rather than having to remember the exact amount of the check. Of course various approaches may be used.

The transaction logic next proceeds to a step 370 in which a transaction request message is sent to the automated banking machine host 356. This may be done in the manner previously discussed by sending one or more messages to the machine host. Generally such messages will include an indication of the identity of the customer and/or their account, encrypted verification data such as a PIN number or biometric identifier, an indication of the nature of the transaction that the customer wishes to conduct and the amount involved. Further in the example embodiment the message sent to the machine host includes data corresponding to at least a portion of the characters included in the MICR line, the amount of the check and the terminal identifier associated with the machine at which the customer is conducting the transaction. Of course in alternative embodiments additional information may also be included in the one or more messages.

In response to receiving the one or more messages in step 370 the machine host 356 is operative to determine whether the transaction should be permitted and to generate a response message. The response message in the example embodiment generally includes instruction data which is operative to cause devices in the machine to operate appropriately as determined by the machine transaction host. This may include for example in the case of a check cashing transaction, accepting the check into a storage area in the machine and if appropriate dispensing cash from the machine to the user. Alternatively the instruction data may include information indicating that the check will not be accepted, and the instruction data may cause the machine to indicate to the customer that the transaction is denied and in appropriate cases the check may be captured by the machine or returned to the customer. The receipt of the response message from the machine host by the machine is represented in a step 372.

In the example embodiment the machine host 356 is operative to include in the responsive message sent to the machine, transaction identifying data. The transaction identifying data includes data representative of information that is useful by being correlated with an electronic image of the check for purposes of further processing the check image. The transaction identifying data in the example embodiment includes a host business date. The host business date of the example embodiment includes time and date data at the location of the machine host and reflects the time at which the transaction request was received It will be assumed for purposes of this example that in step 372 the automated banking machine host authorizes the transaction. In response thereto the machine proceeds to a step 376. In step 376 the machine terminal processor causes the machine to operate in accordance with the instruction data. This may include for example cancelling the check and accepting it for storage in the machine. Alternatively or in addition if the customer has requested to receive cash in exchange for the check the processor in the machine causes machine operation in accordance with the instructions included in the message received from the host, to cause the cash dispenser in the machine to operate to dispense to the user an appropriate amount of cash.

Although it is not shown in the example logic flow, in the example embodiment part of the activities conducted as part of step 376 to complete the transaction is for the automated banking machine to indicate back to the machine host through one or more messages whether the transaction was able to be completed successfully. In the example embodiment the machine sends one or more messages to the machine host indicating whether the machine was able to carry out the transaction successfully responsive to the instruction data. In situations where the machine is not able to carry out the transaction, appropriate measures are taken by the machine host and/or the machine depending on the nature of the failure. This may include for example not crediting the user's account in cases where the check is returned to the user, or crediting a user's account for the check in a case where cash is not dispensed. Of course this is example of many steps that may be taken in response to a malfunction.

In the example embodiment once the automated banking machine has received the transaction identifying data, the machine is operative to send data corresponding to an electronic image of the front and back of the check as well as the transaction identifying data to a remote computer. The machine taking this action is represented in a step 378. In the example embodiment the machine is operative to send an image message including the electronic image(s) and transaction identifying data to an image and transaction server represented 380 in FIG. 14. In the example embodiment the image and transaction server 380 is a different computer than the machine host. Also in some alternative embodiments the machine may operate to modify the image data before it is sent to the image and transaction server. This may include for example, modifying such as by changing or supplementing data corresponding to the MICR line. Alternatively indicia such as transaction data in human or machine readable form may be included in the image data. Of course in other embodiments other approaches may be used.

In carrying out step 378 the automated banking machine is operative to send to the server 380 an image message including data. In the example embodiment the image message sent by the machine to server 380 includes data corresponding to each of the items of transaction identifying data received by the machine in step 372. Although in the example embodiment all of the transaction identifying data is part of the image message, in other embodiments only the portions of the data may be included or additional or other forms of data may be included. Further in alternative embodiments the data may be delivered in multiple messages.

In the example image message there is also included data corresponding to the indicia in the MICR line of the check. This may include an alphanumeric or other character representation as determined by the character recognition software operating in the automated banking machine, of the indicia included in the MICR line portion of the image on the check. Also included in the image message is data representative of the length of the images of the front and back of the check. In addition the example image message includes the image data for the front and the back of the check. In the example embodiment the image data is provided in the message in a bitmap format, and in some embodiments may be provided as a TIFF file. Of course as previously discussed other or additional information may be included in the image message. Further although in the example embodiment the image message is sent as a single message, in other embodiments the necessary data may be provided as multiple messages. Further in the example embodiment while it is shown that the image message is dispatched to a single image server, in alternative embodiments messages may be dispatched to multiple servers or different messages may be sent to different remote servers depending on the nature of the processing to be done with regard to the check.

In the example embodiment the automated banking machine is operative to contact the image server which operates to listen for a socket connection from the machine. The image server operates in response to establishing a socket connection with the machine to spawn a new image socket thread to handle the check image message and for the transaction identifying data to be received. The example image socket thread operates to parse the image message into its individual fields and to check the parsed fields for appropriate syntax and validity. The example socket thread further creates the directory structure for the transmitted check images and saves the front and back electronic images as part of this process. The image server operates in accordance with this programming to change the front and back images of the check from the bitmap format to a different format. In the example embodiment the image data is converted to a JPEG file which compresses the image data and which may facilitate its use and transmission to other connected computers. Of course this approach is example and in other embodiments other approaches may be used.

In addition the server is operative to create a new entry in the database with the fields parsed from the check, which enables the production of tabularized data which can be accessed and utilized in a manner later discussed. The example image socket thread is further operative to acknowledge receipt of the message to the machine to close the socket connection and to the image socket thread.

The activity by the image and transaction server 380 in processing the data through the image socket thread is represented in a step 384 in FIG. 15. The activity executed by the software which produces the thread in sending an acknowledgment back to the machine, is also represented in FIG. 15 by a step 386. Of course it should be understood that these processes and steps are example and in other embodiments other approaches may be used.

In some embodiments the image and transaction server may include software operating therein. The software may operate to cause the at least one processor operating in the server, to modify the image data corresponding to the check images stored in the data store. Such modification may include changing data corresponding to characters (or adding characters) in the MICR line. This may facilitate further processing of the electronic image as a substitute check. Alternatively or in addition, data corresponding to the image may be changed to add additional indicia corresponding to the transaction. Such indicia may be of a type that when provided through an output device is human readable and/or machine readable such as bar code. Alternatively or in addition, image data may be modified to eliminate, encrypt or obscure certain data in the check image for privacy or security reasons. Alternatively or in addition the automated banking machine and/or image server may apply and/or verify authenticity features such as digital watermarks, verification codes or other features in the image data to detect any unauthorized tampering with the image data. Of course these approaches are merely an example of features and functions that may be carried out through operation of one or more servers.

The example image and transaction server is operative to store in its connected data store, data corresponding to transaction identifying data and image data for each check cashing transaction carried out at an automated banking machine to which the server is operatively connected. The example image and transaction server also operates to selectively provide the image and transaction data to other connected computers.

The image and transaction server 380 of the example embodiment operates to provide authorized users with access to transaction data and images related to check cashing transactions that are conducted at automated banking machines. This may be done in a manner similar to that previously discussed in connection with the cashing of checks that are drawn on particular accounts. Specifically in some embodiments users that have contracted for processing services are enabled to find information concerning transactions that have been conducted, analyze transactions and conduct other activities as may be appropriate for purposes of managing their business activities and/or the machines for which they may be responsible. As represented in FIG. 14 access to data which is resident on the image and transaction server 380, may be authorized to remote computers operated by authorized users represented 388, 390 and 392. Client computers 388, 390 and 392 are enabled to communicate with imaging transaction server 380 through a network 394. Network 394 may constitute a variety of different types of public or private networks. It should further be understood that in some cases, such as when a public network such as the Internet is used to access server 380, security measures in addition to those specifically discussed herein may be appropriate to assure the privacy and integrity of the data.

In the example embodiment of the system 350 the machine host and image and transaction servers are operated by Diebold Transaction Services, Inc. (DTS), a wholly owned subsidiary of the assignee of the present invention. In the example embodiment the DTS services include operating a service bureau environment for driving automated banking machines and processing transactions for third parties. Authorized individuals at such third parties are enabled to access the data from the server 380. It should be understood that numerous types of data may be processed and presented, and that the nature of the data discussed herein is example the discussion and is generally limited to transaction data associated with check processing transactions. It should be understood that additional types of transactions may be conducted and that other or additional types of data may be accessed and utilized by individuals who require such services.

Figure 16:
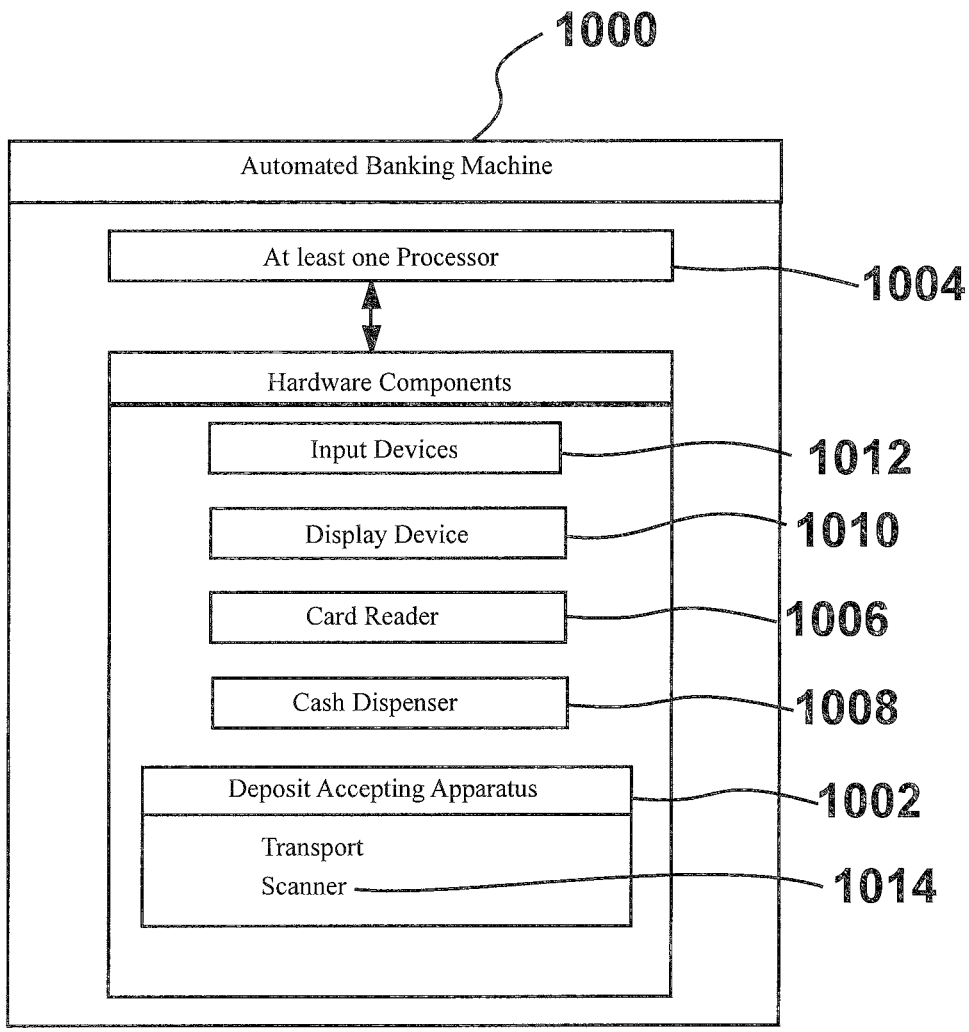
FIG. 16 is a schematic view of an automatic banking machine operative to generate color electronic images of a document.

FIG. 16 depicts another example embodiment of an automated banking machine 1000 that includes a deposit accepting apparatus 1002 adapted to scan documents in colors. The deposit accepting apparatus 1002 may include all or a portion of the features described previously for example embodiments of deposit accepting apparatuses. Here the machine 1000 may include at least one processor 1004, a card reader 1006, a cash dispenser 1008, a display device 1010, and one or more input devices 1012. Such input devices may include for example, a keypad, keyboard, function keys, a touch screen integrated into the display device, or any other type of input device. The at least one processor 1004 may include a computer that controls a plurality of devices in the automated banking machine. Also, or alternatively, the at least one processor may include the individual processors and/or controllers in one or more of the devices of the machine.

In this example embodiment, the at least one processor is operative to cause the at least one card reader to read data from at least one data bearing record corresponding to a financial account of a user operating the machine. Such a data bearing records for example may be a card (e.g., bank card, debit card, credit card), or other data bearing article operative to store a data record corresponding to a financial account (e.g., checking account number, credit account number).

Also, the at least one processor is operative to cause the cash dispenser to dispense cash to an authorized user and to cause a financial account of an authorized user to be assessed an amount corresponding to cash dispensed.

As discussed previously, the deposit accepting apparatus 1002 is operative to receive at least one document from a user operating the machine. Examples of such documents may includes checks or any other item (e.g., an envelope, cash, voucher, lottery ticket, gaming ticket) with visual information recorded thereon. In this described example embodiment, the deposit accepting apparatus 1002 includes a scanner 1014 which in general may be used to carry out features and functions described previously with respect to the optical scanning sensors 132 discussed previously.

Figure 19:
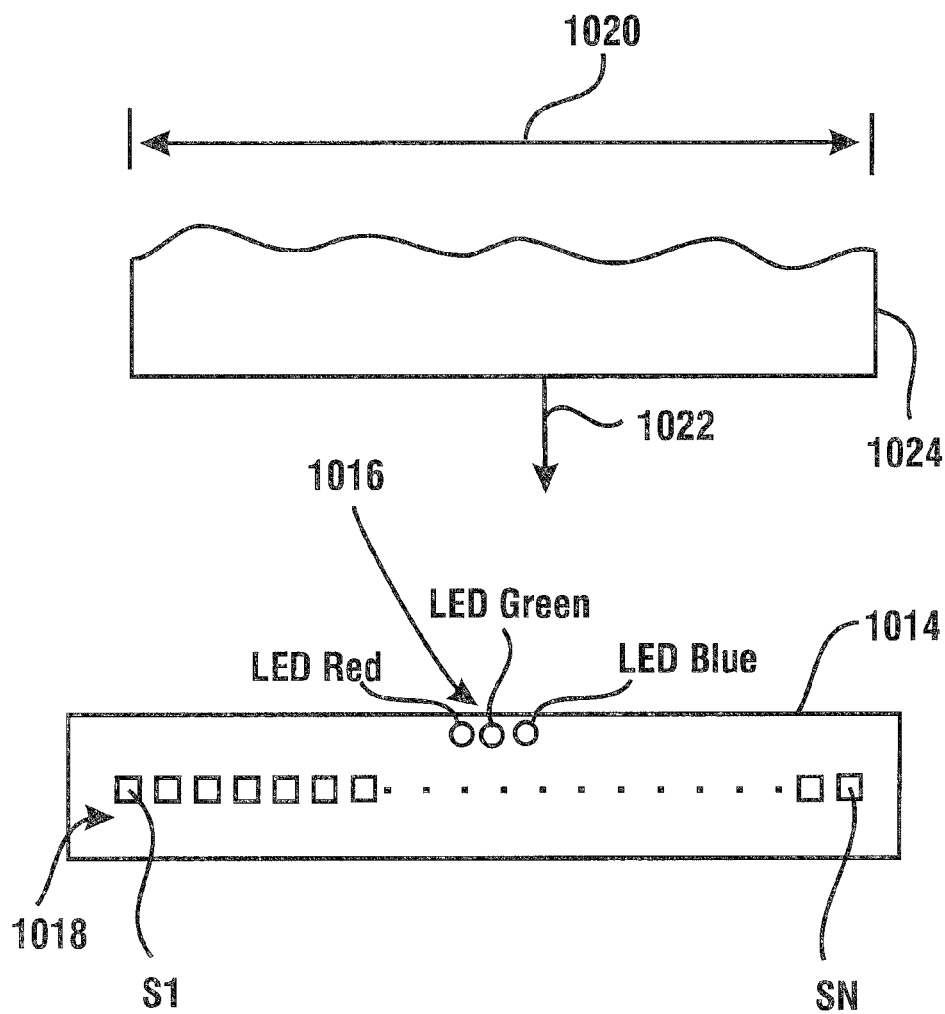
FIG. 19 shows an example of a contact image sensor.

FIG. 19 shows an example of a scanner 1014. In this example embodiment the scanner includes a contact image sensor 1018 having a plurality of pixel scanning portions (sensors) S1-SN orientated in a row. The row of sensors generally extends for a distance 1020 that spans the width of a document 1024 moving in a direction 1022 relative the scanner by a transport of the deposit accepting apparatus.

The scanner also includes three differently colored light sources 1016 in the form of light emitting diodes (LEDs) for emitting three different colors (e.g., primary colors of red, green, and blue). During a scanning operation, only one of these LEDs is turned on at a time. Each of the respective sensors S1-SN generates pixel data while an LED is turned on, which pixel data corresponds to a numeric value representative of intensity of light sensed by the respective sensor. The data from all of the sensors S1-SN produces a row of pixels data which is referred to herein as a scan line. As the document moves relative the sensors S1-SN, a plurality of parallel scan lines are captured at sequentially different parallel section or strips of the document along its length so as to scan the entire surface of the document. The resulting data corresponds to electronic image data for the document which may be stored in a data store such as a memory device of the scanner, the deposit accepting apparatus, the computer of the automated banking machine, and/or a remote server.

In an example embodiment, each sensor S1-SN generates an eight bit pixel data value that is representative of the level of intensity of the reflected light (originating from one of the LEDs) on the surface of the document adjacent the respective sensors S1-SN. However, it is to be understood that in other embodiments the sensors S1-SN may be capable of generating smaller or larger ranges of pixel values (e.g., 4 bit, 10 bit, or other bit resolution pixel values).

In an example embodiment, the scanner 1114 may include a contact image sensor with 850 pixels (sensors) in a row capable of generating 200 dots per inch when moving at 500 mm/sec (relative the document), with the scan line speed of about 4 scan lines per millisecond. Of course in other embodiments other types, sizes and configurations of the image sensors/scanner may be used.

In an example embodiment, each scan line is captured for a document by the sensors S1-SN using reflected light from only one of the available light sources 1016 sources (which light sources output light in different colors). Each of the scan lines in a pair of adjacent scanlines is captured via the sensors S1-SN using a different one of the available light sources 1016 (e.g., for a different primary color). In the example embodiment, with a scanner that has three differently colored light sources 1016 (e.g., a red LED, a green LED and a blue LED), a sequence of three scan lines are captured via the sensors S1-SN in a repeating sequence of the different light sources.

Figure 17:
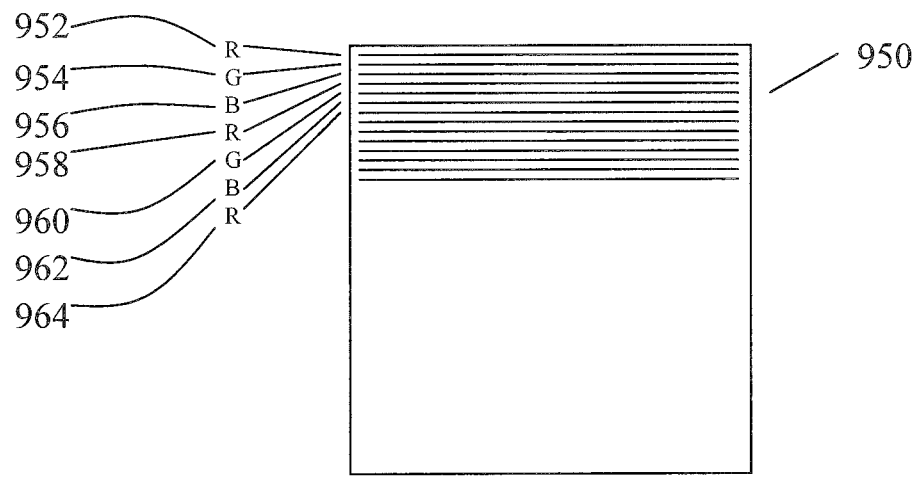
FIG. 17 shows an example of how a document is scanned by illuminating only one of three different colored light sources for each scan line.

FIG. 17 depicts a set of scan lines for a sequence of colors that may be captured from a document 950 according to this described example. Here, a first one of the scan lines 952 may be captured using the red LED, for a first strip of the document. Then a second one of the scan lines 954 adjacent to the first scan line may be captured using the green LED for a second strip of the document adjacent the first strip. Then a third one of the scan lines 956 adjacent to the second scan line may be captured using the blue LED for a third strip of the document adjacent the second strip. This pattern of capturing scan lines for a document for a sequence of different colors, continues (e.g., scan lines 958, 960, 962, 964) for the length of the document.

At this point, a visual representation of an electronic image for the captured scan lines of pixels data outputted through a display device may have a striped or interlaced appearance with an alternating sequence of colored stripes. In order to produce electronic image data operative to display a more accurate depiction of the document in color, an example embodiment may include at least one processor in the automated banking machine, the deposit accepting apparatus, and/or the remote server, that is operative to generating a reconstructed electronic image by interpolating missing color data for the pixels in a particular scan line from the pixel data in adjacent and/or near scan lines which were acquired using the light sources corresponding to the missing colors for the particular scan line. In the example embodiment, by scanning every third line in the same color, it assures that each line not scanned in a particular color is beside another scan line that was scanned in the non-scanned color and is two lines away from another line scanned in the same non-scanned color. For example, scan line 958 was scanned in red and not green. However, scan line 960 is beside scan line 958 and scan line 960 was scanned in green. Additionally, scan line 954 is two scan lines away from scan line 958 and was scanned in green.

In this example embodiment, green color pixel data for the pixels in scan lines 960 and 954 may be used to interpolate green color data for the pixel data in line 958. However, because scan line 960 is closer to scan line 958 than scan line 954 (and therefore may more closely indicate the actual green optical properties of the section/strip of the document associated with scan line 958), the green color pixel data from scan line 960 may be given a higher weight than the green color pixel data in scan line 954 when calculating a green color data for the pixels in scan line 958. For example, green color pixel data in scan line 960 for a first pixel may be accorded a doubling weighting factor relative the green color pixel data for a second pixel in scan line 954. Thus if a green color pixel value in scan line 960 for the first pixel has an actual scanned intensity value of 100, and a green color pixel value in scan line 954 for the second pixel has an actual scanned intensity value of 40, an interpolated green color pixel value to be included with the third pixel data in scan line 958 (located between the first pixel data and second pixel data) may be determined by at least one processor to be a value of $80=(100*2+40)/3$. Also, in addition to interpolating the missing green color data for pixels in scan line 958, it is to be understood that the interpolation calculation may also include interpolating the missing blue color data for the pixel data in scan line 958. Such missing blue color data may be determined from scan lines 956 and 962 for scan line 958 for example.

In these described examples, pixel data in a common column on opposite sides of a given pixel data (e.g in different rows) may be used to interpolate missing color data for the given pixel data. However, it is to be understood that more complex interpolation calculations may be used. For example other interpolation calculations for missing color data may use more than two other scan lines, such as scan lines further away from a given scan line. Also, for example other interpolation calculations for missing color data may use pixel data in different columns and different rows from a given pixel data (e.g., such as pixel data in columns and rows that are generally diagonally offset from a given pixel data). Also, in example embodiments, interpolation may not be performed for the first two or last two scan lines for a document An alternative example embodiment of the scanner may be operative to acquire each scan line using two of the three colored light sources (rather than one colored light source as discussed previously). Thus for each section/strip of the document being scanned, two of the three colored light sources may be sequently illuminated. For each scan line, pixel data from the sensors S1-SN may then be acquired for the different times the two colored light sources are illuminated.

Figure 18:
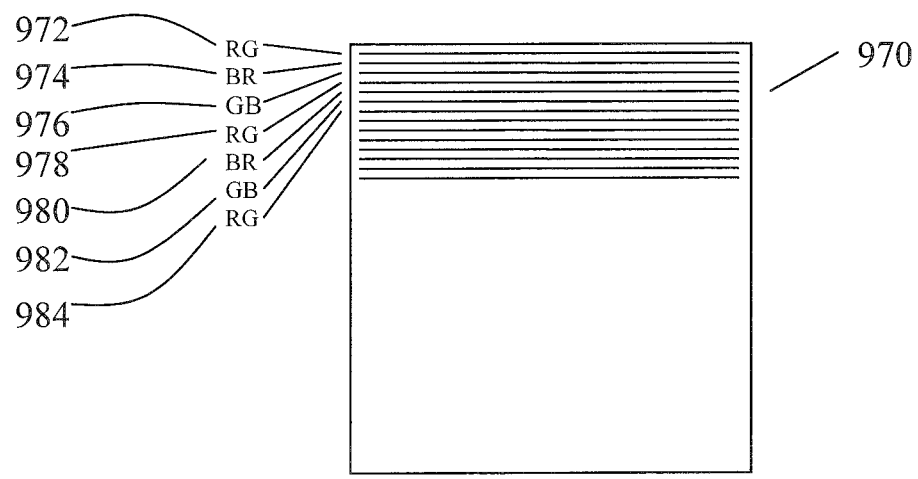
FIG. 18 shows an example of how a document is scanned by illuminating only two of three different colored light sources for each scan line.

FIG. 18 depicts a set of scan lines for a sequence of colors that may be captured from a document 970 for this alternative example. Here, a first one of the scan lines 972 may be captured using the red LED followed by the green LED, for a first strip of the document. Then a second one of the scan lines 974 adjacent to the first scan line may be captured using the blue LED followed by the red LED for a second strip of the document adjacent the first strip. Then a third one of the scan lines 976 adjacent to the second scan line may be captured using the green LED followed by the blue LED for a third strip of the document adjacent the second strip. This pattern of capturing scan lines for a document for a sequence of different colors continues (e.g., scan lines 978, 980, 982, 984) for the length of the document. As discussed previously, the missing pixel color data for a given scan line may be interpolated from the pixel color data from adjacent scan lines.

This embodiment may take twice as long to scan a document as does the previous described embodiment in which the scan lines are initially captured using only one of three colored light sources per scan line. However, this alternative embodiment may still be faster at scanning a document in color than scanning each scan line using all three colored light sources.

In addition, it is to be understood that pixel data acquired for each scan line using less than three light sources, may be stored in a memory with locations reserved for the missing pixel color data. For example, each pixel data stored for each scan line in a memory, may include 8 bit values for each of three colors (e.g., a set of values ranging from 0-255 for red, green, and blue colors such as 244, 166, 55). However, because only one (or two) light sources were used when acquiring pixel data for a scan line, then each pixel data for the scan line may have the non-scanned colors in the pixel data set to a value of 0 or other value indicative of no-color (e.g., a set of values for red, green, and blue colors such as 244, 0, 0—where only the Red LED was illuminated) for the scan line. Then, as discussed previously, the processor may set the zero color values for each pixel data to different non-zero values (if applicable) via interpolation using pixel data from adjacent and/or near scan lines.

Electronic image data that includes both originally scanned pixel color data and the additional interpolated pixel color data is referred to herein as a reconstructed electronic image. Such a reconstructed electric image may be used to evaluate/determine information on a check as discussed previously. For example the color electronic image data may be used by the machine to distinguish indicia printed or written on a check that cannot be distinguished from a grayscale image of the check.

In addition the at least one processor in the machine may cause visual color images of the front and back of a document to be outputted through a display device responsive to the reconstructed electronic image. The at least one computer may also be responsive to inputs (from a user) representative of an acceptance of the displayed images, to cause such images to be processed and accepted as valid images of the document. For example if the document corresponds to a check, once the user verifies that the displayed color images of the front and back of the check are acceptable (through an input to an input device of the machine), the at least one computer in the machine may be operative to continue processing the check deposit transaction. However, if the use provides an input representative of the displayed images not being acceptable, the at least one computer may be operative to attempt to re-scan the document, perform further image processor, and/or return the document to the user. Also in cases where the document is to be re-scanned and/or further processed, an alternative embodiment of the machine may prompt the user for additional information regarding why the displayed images are unacceptable (e.g., too dark, too light, too blurry, or/or other image defects). Responsive to such selections by the user through operation of an input device of the machine, the machine may attempt to re-scan and/or further processes the document in a manner which attempts to compensate for the defects indicated by the user.

In addition as discussed previously, when a document is accepted, it may be transported to an acceptance area within the machine. Also, when a document is rejected it may be returned to the user or placed into a rejected document area within the machine.

In further example embodiments, the at least one computer may be operative to carry out post-processing image operations on the reconstructed image. For example, images submitted to a remote server with respect to deposited checks may require only black and white images of checks. Also character recognition may be carried out more accurately using black and which image data. Thus the at least one computer may be operative to convert the reconstructed color image of the check to a black and white and/or grayscale image of the check.

Computer software instructions used in operating the automated banking machines and connected computers may be loaded from computer readable media or articles of various types into the respective computers. Such computer software may be included on and loaded from one or more articles such as diskettes, compact disks, CDs, DVDs, tapes, flash memory device, hard drives and/or other internal or portable storage devices placed in operative connection with the automated banking machine. Other articles which include data representative of the instructions for operating computers in the manner described herein are suitable for use in achieving operation of automated banking machines and systems in accordance with example embodiments.

The example embodiments of the automated banking machines and systems described herein have been described with reference to particular software components and features. Other embodiments of the invention may include other or different software components which provide similar functionality.

In the foregoing description certain terms have been described as example embodiments for purposes of brevity, clarity and understanding. However no unnecessary limitations are to be implied therefrom because such terms are used for descriptive purposes and are intended to be broadly construed. Moreover the descriptions and illustrations herein are by way of examples and the invention is not limited to the features shown or described.

Further, in the following claims any feature described as a means for performing a function shall be construed as encompassing any means known to those skilled in the art as being capable of carrying out the recited function, and shall not be deemed limited to the particular means shown or described for performing the recited function in the foregoing description, or mere equivalents thereof.

Having described the features, discoveries and principles of the invention, the manner in which it is constructed and operated, any of the advantages and useful results attained; the new and useful structures, devices, elements, arrangements, parts, combinations, systems, equipment, operations, methods, processes and relationships are set forth in the appended claims.

We claim:

1. Apparatus comprising:
   at least one scanner,
      wherein the at least one scanner includes at least three light sources, each operable to respectively emit a different color of light,
      wherein the at least one scanner includes a plurality of sensors arranged in a row,
         wherein each sensor is operable to acquire pixel data representative of light intensity,
      wherein the at least one scanner is operable to acquire an electric image of at least one side of a document as the document moves relative to the row of sensors,
      wherein the electronic image comprises a plurality of respective parallel scan lines corresponding to respective strips of the at least one side,
         wherein respective scan lines include a plurality of pixel data representative of levels of intensity of light reflected from the respective strip and sensed by the sensors for two of the colors of light per pixel,
            wherein the at least one scanner in acquiring the pixel data for a respective scan line, uses the two colors to sequently illuminate the respective strip, resulting in non use of at least one of the colors in illuminating the respective strip,
            wherein at least one set of three sequentially adjacent scan lines includes:
               a first scan line comprising pixel data acquired during illumination of a first one and a second one of the at least three light sources,
               a second scan line comprising pixel data acquired during illumination of the second one and a third one of the at least three light sources, and
               a third scan line composing pixel data acquired during illumination of the third one and the first one of the at least three light sources;
         wherein the electronic image allows for generation of a reconstructed electronic image of the at least one side wherein for each respective scan line corresponding to a respective strip, the reconstructed electronic image includes the acquired pixel data and additional pixel data interpolated using at least one adjacent scan line adjacent to the respective scan line,
            wherein the additional pixel data is representative of a sensed intensity of light reflected from at least one adjacent strip adjacent to the respective strip, for at least one of the colors not used in illuminating the respective strip.

2. The apparatus according to claim 1 and further comprising an automated transaction machine, wherein the machine includes the at least one scanner, wherein the at least one scanner is operable to acquire an electronic image at least one side of a document that comprises a check,
  wherein the machine includes at least one reader operable to read machine user data usable to identify a financial account with which a transaction can be carried out through use of the machine,
  wherein the machine includes a check acceptor operable to receive checks from machine users,
  wherein the machine includes a cash dispenser,
    wherein the machine is operable to cause the cash dispenser to dispense cash in exchange for a check received by the check acceptor,
      wherein the at least on scanner is operable to acquire an electronic image of the check received by the check acceptor.

3. The apparatus according to claim 1 wherein the at least one scanner is associated with at least one processor that is operable to generate the reconstructed electronic image.

4. The apparatus according to claim 3 wherein the at least one processor is operable to interpolate the additional pixel data responsive at least in part to the relative proximity of the at least one adjacent scan line to the respective scan line.

5. The apparatus according to claim 1 wherein the light sources include a red LED, a green LED, and a blue LED.

6. The apparatus according to claim 1 wherein at least one set of three sequentially adjacent scan lines of the electronic image includes:
  a first scan line comprising pixel data acquired during only illumination of a first pair of the light sources,
  a second scan line comprising pixel data acquired during only illumination of a second pair of the light sources,
    wherein the second pair differs from the first pair; and
  a third scan line comprising pixel data during only illumination of a third pair of the light sources,
    wherein the third pair differs from the first pair,
    wherein the third pair differs from the second pair.

7. A method comprising:
  (a) operating at least one scanner to emit a least one color of light, wherein the at least one scanner includes at least three light sources, each operable to respectively emit a different color of light; and
  (b) operating the at least one scanner to acquire an electronic image of at least one side of a document as the document moves relative to a row of sensors,
    wherein the at least one scanner includes the row of sensors,
      wherein each sensor is operable to acquire pixel data representative of light intensity,
    wherein the electronic image acquired comprises a plurality of respective parallel scan lines corresponding to respective strips of the at least one side,
      wherein respective scan lines include a plurality of pixel data representative of levels of intensity of light reflected from the respective strip and senses by the sensors for two of the colors of light per pixel,
        wherein the at least one scanner in acquiring the pixel data for a respective scan line, uses the two colors to sequently illuminate the respective strip, resulting in nonuse of at least one of the colors in illuminating the respective strip,
      wherein at least one set of three sequentially adjacent scan lines includes:
        a first scan line comprising pixel data acquired during illumination of a first one and a second one of the at least three light sources,
        a second scan line comprising pixel data acquired during illumination of the second one and a third one of the at least three light sources, and
        a third scan line composing pixel data acquired during illumination of the third one and the first one of the at least three light sources
    wherein the electronic image is acquired in a manner that allows for generation of a reconstructed electronic image of the at least one side,
    wherein for each respective scan line corresponding to a respective strip, the reconstructed electronic image includes the acquired pixel data and additional pixel data interpolated using at least one adjacent scan line adjacent to the respective scan line,
      wherein the additional pixel data is representative of a sensed intensity of light reflected from at least one adjacent strip adjacent to the respective strip, for at least one of the colors not used in illuminating the respective strip.

8. The method according to claim 7 wherein the at least one scanner is operable to acquire an electronic image of at least one side of a document that comprises a check,
  wherein an automated transaction machine includes that at least one scanner,
  wherein the machine includes at least one reader operable to read machine user data usable to identify a financial account with which a transaction can be carried out through use of the machine,
  wherein the machine includes a check acceptor operable to receive checks from machine users,
  wherein the machine includes a cash dispenser,
    wherein the machine is operable to cause the cash dispenser to dispense cash in exchange for a check received by the check acceptor,
  wherein (b) includes operating the at least one scanner to acquire an electronic image of a check received by the check acceptor.

9. The method according to claim 7 and further comprising:
  (c) operating at least one processor associated with the at least one scanner to generate the reconstructed electronic image.

10. The method according to claim 9 and further comprising:
  (d) operating the at least one processor to interpolate the additional pixel data, responsive at least in part to relative proximity of the at least one adjacent scan line to the respective scan line.

* * * * *